(12) United States Patent
Trout et al.

(10) Patent No.: US 9,058,609 B2
(45) Date of Patent: Jun. 16, 2015

(54) MODIFICATION OF BRAND REPRESENTATIONS BY A BRAND ENGINE IN A SOCIAL NETWORK

(75) Inventors: Robert C. Trout, Burlingame, CA (US); Christopher W. Higgins, Portland, OR (US); Joseph O'Sullivan, Oakland, CA (US); Marc E. Davis, San Francisco, CA (US); Ronald G. Martinez, San Francisco, CA (US)

(73) Assignee: YAHOO! INC., Sunnyvale, CA (US)

( * ) Notice: Subject to any disclaimer, the term of this patent is extended or adjusted under 35 U.S.C. 154(b) by 241 days.

(21) Appl. No.: 12/112,628

(22) Filed: Apr. 30, 2008

(65) Prior Publication Data
US 2009/0276453 A1    Nov. 5, 2009

(51) Int. Cl.
*G06F 17/30*    (2006.01)
*G06Q 30/02*    (2012.01)

(52) U.S. Cl.
CPC .......... *G06Q 30/02* (2013.01); *G06F 17/30029* (2013.01)

(58) Field of Classification Search
None
See application file for complete search history.

(56) References Cited

U.S. PATENT DOCUMENTS

| | | | |
|---|---|---|---|
| 7,463,898 B2 | 12/2008 | Bayne | |
| 2002/0103789 A1* | 8/2002 | Turnbull et al. | 707/3 |
| 2002/0107728 A1* | 8/2002 | Bailey et al. | 705/14 |
| 2003/0050058 A1* | 3/2003 | Walsh et al. | 455/426 |
| 2003/0233283 A1 | 12/2003 | Shah | |
| 2004/0122801 A1* | 6/2004 | Schirmer et al. | 707/3 |
| 2005/0171955 A1 | 8/2005 | Hull et al. | |
| 2006/0010240 A1 | 1/2006 | Chuah et al. | |
| 2006/0230061 A1 | 10/2006 | Sample et al. | |
| 2007/0033177 A1* | 2/2007 | Friedman | 707/4 |
| 2007/0095903 A1* | 5/2007 | Suenbuel | 235/383 |
| 2007/0118394 A1 | 5/2007 | Cahoon | |

(Continued)

FOREIGN PATENT DOCUMENTS

JP    2007287131    11/2007
KR    10-2006-0001014 A    1/2006

(Continued)

OTHER PUBLICATIONS

Liu, Hugo, and Pattie Maes. "InterestMap: Harvesting Social Network Profiles for Recommendations." IUI'05. Jan. 9, 2005. <http://web.media.mit.edu/~hugo/publications/papers/BP2005-hugo-interestmap.doc>.*

(Continued)

*Primary Examiner* — Syed Hasan
(74) *Attorney, Agent, or Firm* — James J. DeCarlo; Greenberg Traurig, LLP

(57) ABSTRACT

A brand engine receives a request from a user device operated by a first user to display user information of a second user. User information of the first user is mapped to at least the user information of the second user by the brand engine. The mapping may map the user information of the first user to user information of further users in a social network. The mapping may map of any combination of spatial, temporal, social, and topical data related to the users. A modified representation of a brand profile of the second user is generated by the brand engine based on the mapping. The modified representation is transmitted to the user device. The user device displays the modified representation for the first user. The modified representation of the brand profile may include any combination of filtered and/or sorted brand objects, recommended brand objects, and/or modified brand objects.

18 Claims, 29 Drawing Sheets

(56) References Cited

U.S. PATENT DOCUMENTS

| | | | |
|---|---|---|---|
| 2007/0192106 A1 | 8/2007 | Zilca | |
| 2008/0010198 A1* | 1/2008 | Eliscu | 705/40 |
| 2008/0033776 A1 | 2/2008 | Marchese | |
| 2008/0133716 A1* | 6/2008 | Rao et al. | 709/220 |
| 2008/0154898 A1* | 6/2008 | Cheng et al. | 707/6 |
| 2008/0235078 A1* | 9/2008 | Hong et al. | 705/10 |
| 2009/0276453 A1 | 11/2009 | Trout et al. | |
| 2009/0276459 A1 | 11/2009 | Trout et al. | |
| 2013/0317908 A1* | 11/2013 | Kanigsberg et al. | 705/14.53 |

FOREIGN PATENT DOCUMENTS

| | | | |
|---|---|---|---|
| WO | 2009/134597 A2 | 11/2009 | |
| WO | 2009/134597 A3 | 1/2010 | |

OTHER PUBLICATIONS

U.S. Appl. No. 12/112,843, filed Apr. 30, 2008, 98 pages.

International Search Report and Written Opinion for International Appl. No. PCT/US09/039802 dated Nov. 18, 2009, 10 pages.

Rodgers, Zachary "Questions for Facebook VP of Media Sales Mike Murphy", ClickZ, <http://www.clickz.com/3626474>, Retrieved Mar. 20, 2010, (Jul. 19, 2007), 3 pages.

Smith, Justin "Facebook lowers ad prices with performance-based Flyers Pro", Inside Facebook, Tracking Facebook and the Facebook Platform for Developers and Marketers, <http://www.insidefacebook.com/2007/09/16/facebook-lowers-ad-prices-with-performance-based-flyers-pro>, Retrieved Mar. 21, 2010, (Sep. 16, 2007), 6 pages.

Pearlman, Leah "Facebook Ads", <http://blog.facebook.com/blog.php?post=6972252130>, Retrieved Mar. 21, 2010, (Nov. 6, 2007), 5 pages.

Facebook HotLists, About HotLists, <http://www.facebook.com/hotlists?v=info&viewas=0>, Retrieved Mar. 20, 2010, 2 pages.

Lovemarks: the future beyond brands, Newsletter, Weekly 5 of the Best, <http://www.lovemarks.com/index.php?pageID=20023&newsletterid=51>, Retrieved Mar. 21, 2010, (Oct. 3, 2007), 2 pages.

Rosenstein, Justin Facebook Opening up, <http://blog.facebook.com/blog.php?post=7057627130>, Retrieved Mar. 21, 2010, (Nov. 9, 2007), 5 pages.

Facebook Log in to ProductPulse, <http://www.facebook.com/tos.php?api_key=657701add4ea647ed64c9a0ef910a1b4&next=>, Retrieved Mar. 21, 2010, 1 page.

James Hong: Reinventing HOTorNOT, Part II, <http://james.hotornot.com/2007/07/reinventing-hotornot-part-ii.html>, Retrieved Mar. 21, 2010, (Jul. 2, 2007), 5 pages.

James Hong: Reinventing HOTorNOT, Part III, <http://james.hotornot.com/2007/07/reinventing-hotornot-part-iii.html>, Retrieved Mar. 21, 2010, (Jul. 9, 2007), 2 pages.

Official Action issued in connection with U.S. Appl. No. 12/112,843 on Oct. 22, 2012.

Official Action issued in connection with U.S. Appl. No. 12/112,843 on Apr. 11, 2012.

Official Action issued in connection with U.S. Appl. No. 12/112,843 on Oct. 14, 2011.

Official Action issued in connection with U.S. Appl. No. 12/112,843 on Apr. 27, 2011.

Official Action issued in connection with U.S. Appl. No. 12/112,843 on Jan. 4, 2011.

Official Action issued in connection with U.S. Appl. No. 12/112,843 on Jul. 27, 2010.

Official Action issued in connection with U.S. Appl. No. 12/112,843 on Jun. 26, 2013.

* cited by examiner

MODIFICATION OF BRAND REPRESENTATIONS BY A BRAND ENGINE IN A SOCIAL NETWORK

BACKGROUND OF THE INVENTION

1. Field of the Invention

The present invention relates to brand advertising in an online social context.

2. Background Art

Traditionally, a brand is associated with a product or service which has gained or has been provided with an identity. A purpose of a brand is to differentiate itself from competitors. A brand may be represented by a bundle of tangible (e.g., functional product and/or service characteristics) and/or intangible (e.g., emotional and/or symbolic) meanings that add value to the brand. A brand may be associated with any type of product and service. A few well known example brands include Legos™ (a toy brand), BMW™ (an automobile manufacturer brand), and Merrill Lynch™ (a financial management and advisory company brand). Brands may also be associated with entities that are less tangible, including personalities (e.g., Lindsey Lohan, Michael Jordan, Oprah), movie franchises (e.g., Star Wars™, Harry Potter), television franchises (e.g., the television shows "Lost" and "The Office"), and sports franchises (e.g., The Dallas Cowboys, The New York Yankees).

Advertising is a form of communication used to inform potential customers about products and services, and how to obtain and/or use them. Advertisers are constantly searching for improved ways of connecting with potential customers. In recent years, online advertising has become more prevalent. Online advertising is a form of advertising that uses the Internet and World Wide Web in order to deliver marketing messages and attract customers. Typical techniques for online advertising include the posting of "banner ads" on webpages, providing contextual ads on search engine results pages, and email marketing, which may include the sending of email spam.

Social networking services exist on the World Wide Web that are intended to build online social networks for communities of people having common interests and/or activities, or who are interested in exploring the interests and activities of others. Such services provide various ways for users to interact, including blogging, discussion groups, email, file sharing, instant messaging, online chat, video, voice chat, etc. Social networking services such as MySpace.com™ and Facebook™ enable users to create self-description pages (also referred to as a "profile page"), and enable the users to link their pages with pages of friends.

Advertisers are targeting social networking services as a relatively new advertising frontier. For example, advertisers may provide banner ads that appear when users of MySpace.com™ of Facebook™ view their own profile pages, when they view profile pages of their linked friends, and/or when they view other pages of these websites. Furthermore, Facebook™ includes applications that enable further types of advertising. For example, Facebook™ includes an application called "HotLists," which enables users to select and list topics of interest in their profile page. A selected topic appears as a graphical icon (a "Stylepix") in the user's profile page. A user may click on the topic icon to open a webpage that may provide further information regarding the topic.

The advertising provided by the HotLists application is enhanced by the users of Facebook™. For instance, a user may notice a topic icon in a friend's profile page that represents a topic of interest to the user. The user may add the topic icon to the user's own profile page if the user desires to express his/her interest in the topic. In this manner, information regarding the topic may be spread between users without needing direct action from the advertiser.

Such advertising schemes provided by social networking services have disadvantages, however. For instance, the topic icons of the HotLists application in Facebook™ are presented with little to no variability. What is desired is an online advertising technique useable in a social networking environment that takes advantage of the social network to provide more relevant, interesting, and variable advertising to the social network participants.

BRIEF SUMMARY OF THE INVENTION

Brand information is enabled to be associated with users in a social network in the form of shareable brand objects. Each user in the social network may select one or more brand objects of interest to the user. The brand objects selected by a user form a brand profile of the user, which may be displayed along with other information regarding the user. For example, the brand profile may be displayed on a user profile page for the user. Other users in the social network may view the user profile page of the user to view the selected brand objects, and to copy any of brand objects being viewed for inclusion in their own respective brand profiles.

Embodiments of the present invention enable modifications to these brand profiles to be generated based on context, and to be displayed. For instance, in a first aspect of the present invention, a request may be received from a user device operated by a first user to display user information of a second user. User information of the first user is mapped to at least the user information of the second user. The mapping may further map the user information of the first user to the user information of additional users in the social network. The mapping may include a mapping of any combination of spatial, temporal, social, and topical data related to the users.

A modified representation of the brand profile of the second user is generated based on the mapping. The modified representation of the brand profile of the second user is transmitted to the user device. The user device displays the modified representation of the brand profile for the first user. The modified representation of the brand profile may include any combination of filtered and/or sorted brand objects, recommended brand objects, and/or modified brand objects. Revenue may be enabled to be generated based on display of the modified representation of second brand profile.

In an example of the mapping, user data may be retrieved from the user information of each of the first user and the plurality of users. The user data includes one or more of spatial, temporal, social, or topical data associated with each user. The retrieved user data may be graphed.

One or more relationships between brand profiles of the first user and the plurality of users may be determined from the graphing. Probability scores corresponding to the determined one or more relationships may be determined. The modified representation of the second brand profile may be generated based on the probability scores.

In a further aspect, a brand engine may include a mapping module and a brand profile modifier module. The mapping module may be configured to receive a request from a user device operated by a first user to display user information of a second user. The first user has associated user information that includes a first brand profile. The first brand profile includes a first plurality of brand objects. The user information of the second user includes a second brand profile that includes a second plurality of brand objects. The mapping module is configured to map the user information of the first user to at least the user information of the second user to generate a map. The brand profile modifier module is configured to generate a modified representation of the second brand profile based at least on the generated map. The brand engine is configured to transmit the modified representation of the second brand profile to the user device to enable the modified representation to be displayed by the user device.

These and other objects, advantages and features will become readily apparent in view of the following detailed description of the invention. Note that the Summary and Abstract sections may set forth one or more, but not all exemplary embodiments of the present invention as contemplated by the inventor(s).

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 9:
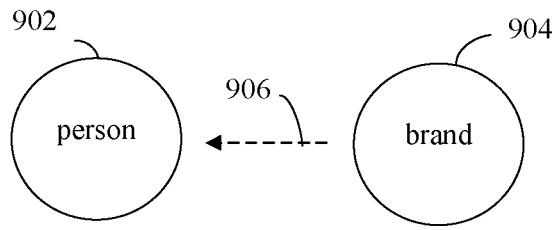
Figure 10:
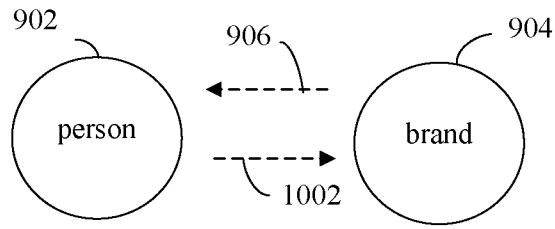

FIGS. 9 and 10 each illustrate a type of interaction between two nodes in a network.

Figure 11:
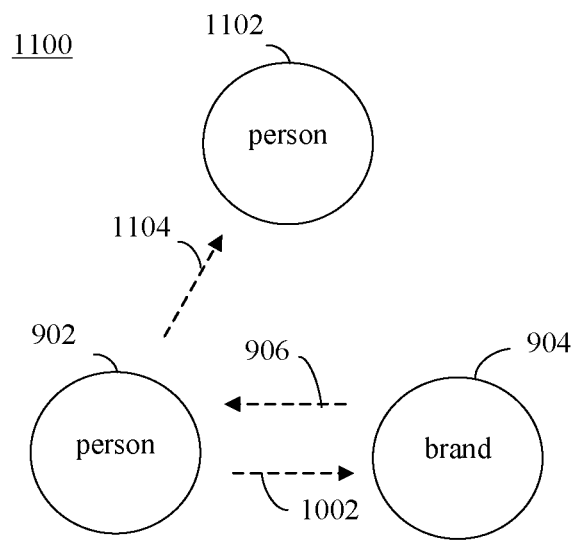
Figure 12:
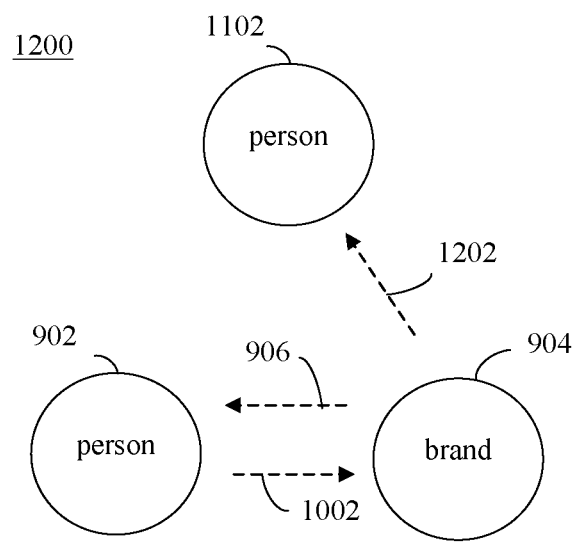

FIGS. 11 and 12 each illustrate interactions between three nodes in a network.

Figure 13:
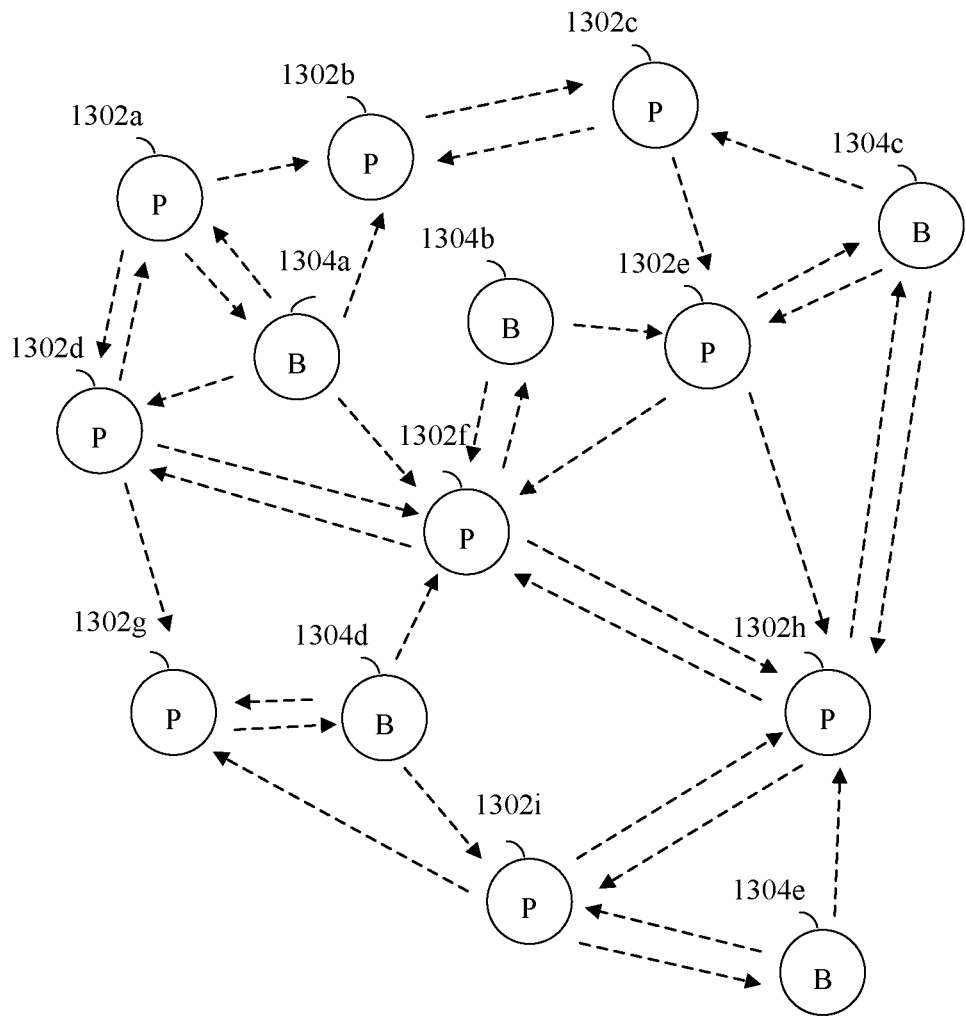

FIG. 13 shows example interactions between brands and users in an example social network, according to an embodiment of the present invention.

Figure 14:
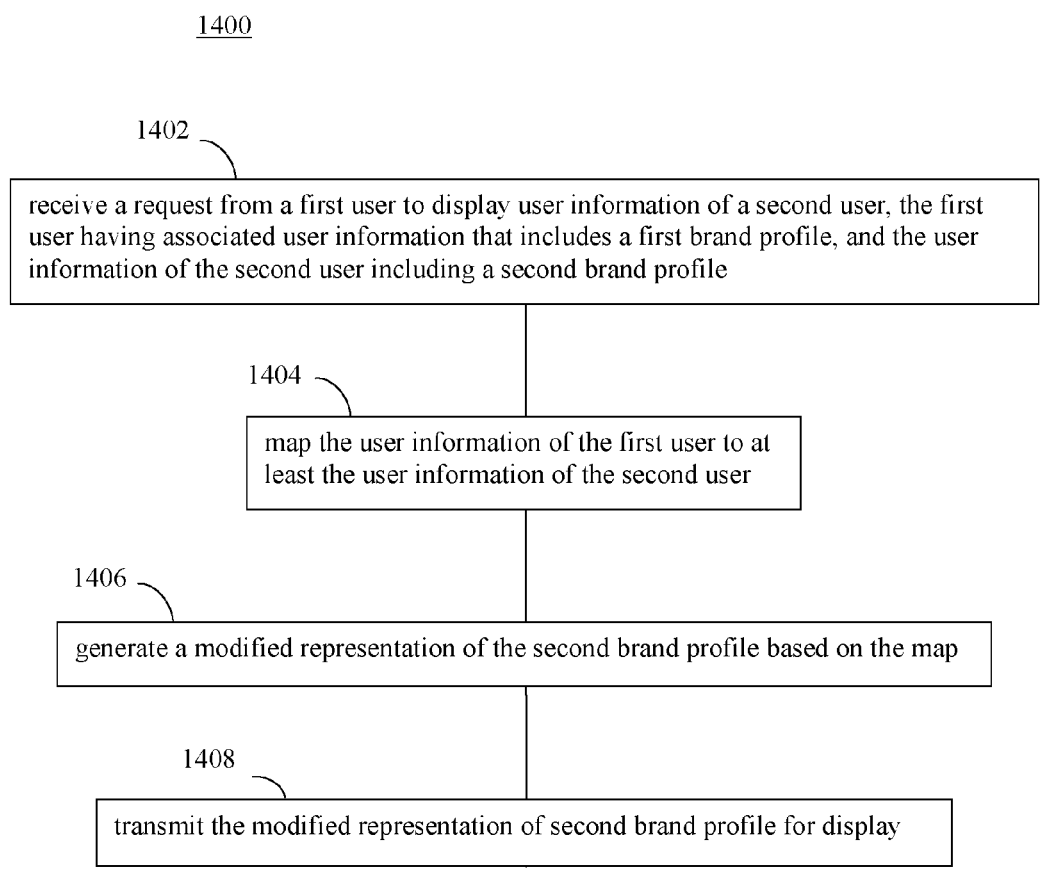

FIG. 14 shows a flowchart for displaying brand information, according to an example embodiment of the present invention.

Figure 15:
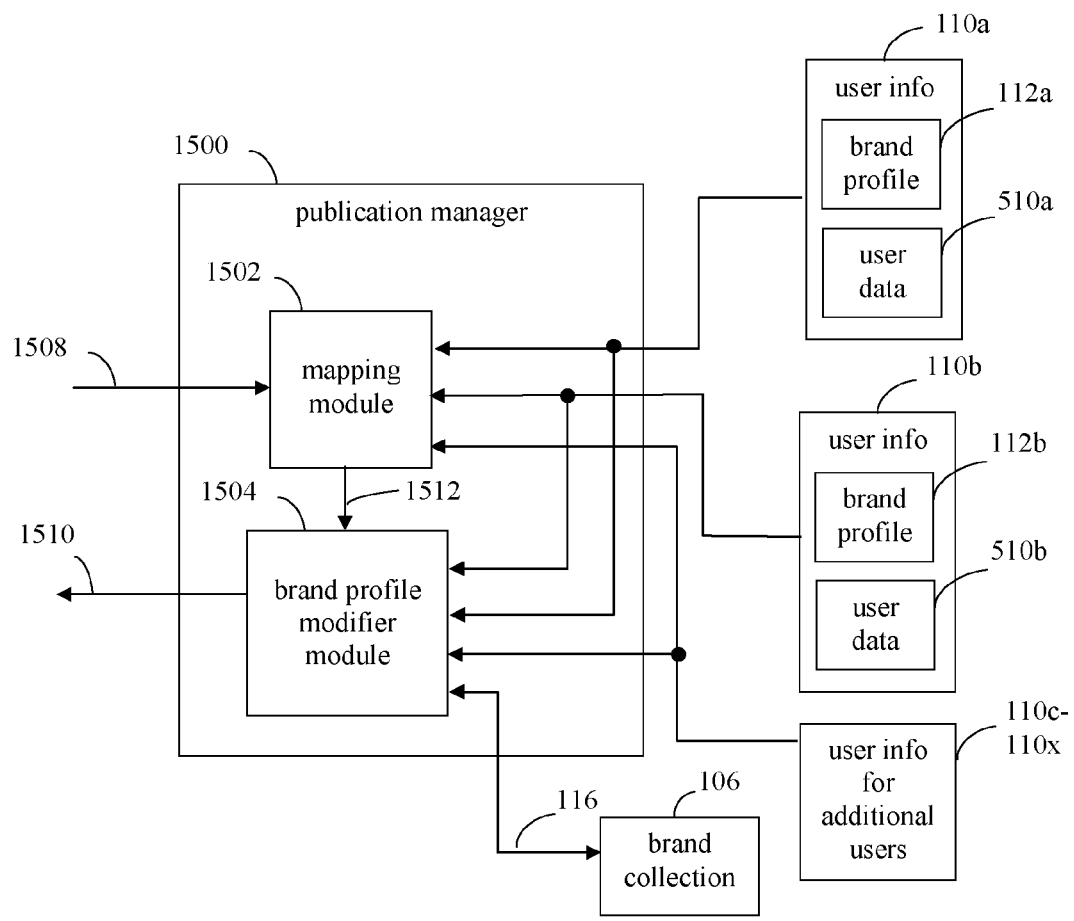

FIG. 15 shows a block diagram of an example publication manager, according to an embodiment of the present invention.

Figure 16:
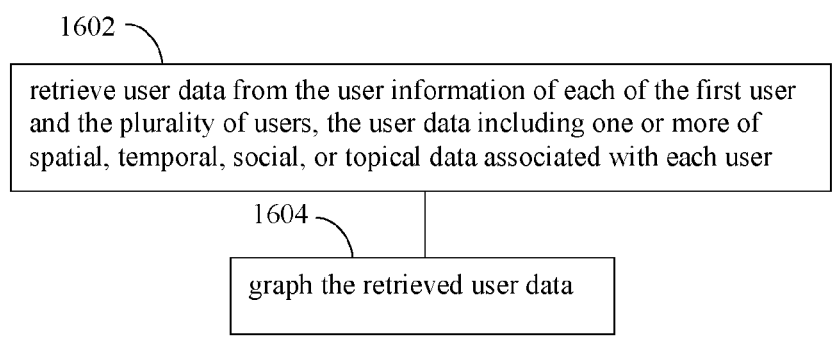

FIG. 16 shows a flowchart for mapping user data, according to an example embodiment of the present invention.

Figure 17:
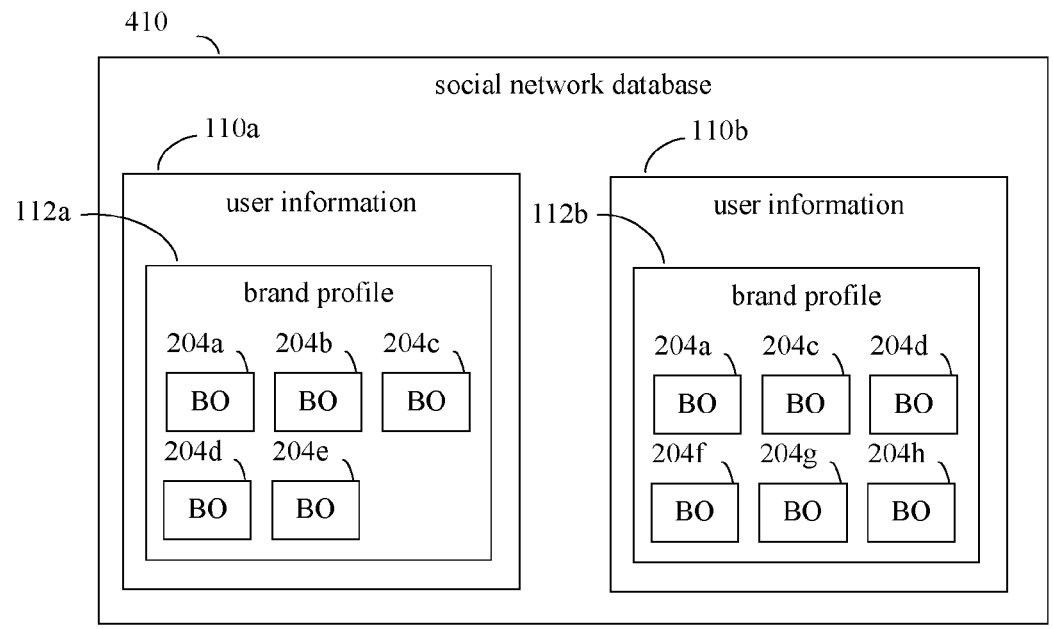

FIG. 17 shows example brand profiles for first and second users, according to an embodiment of the present invention.

Figure 18:
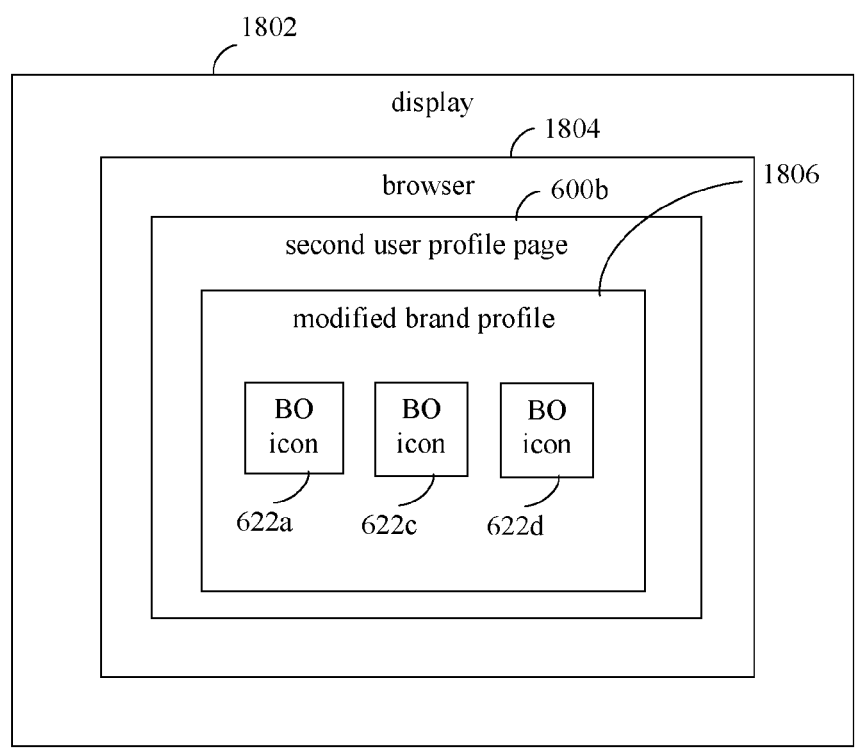

FIG. 18 shows a block diagram of a display of a user device that displays a filtered brand profile, according to an example embodiment of the present invention.

Figure 19:
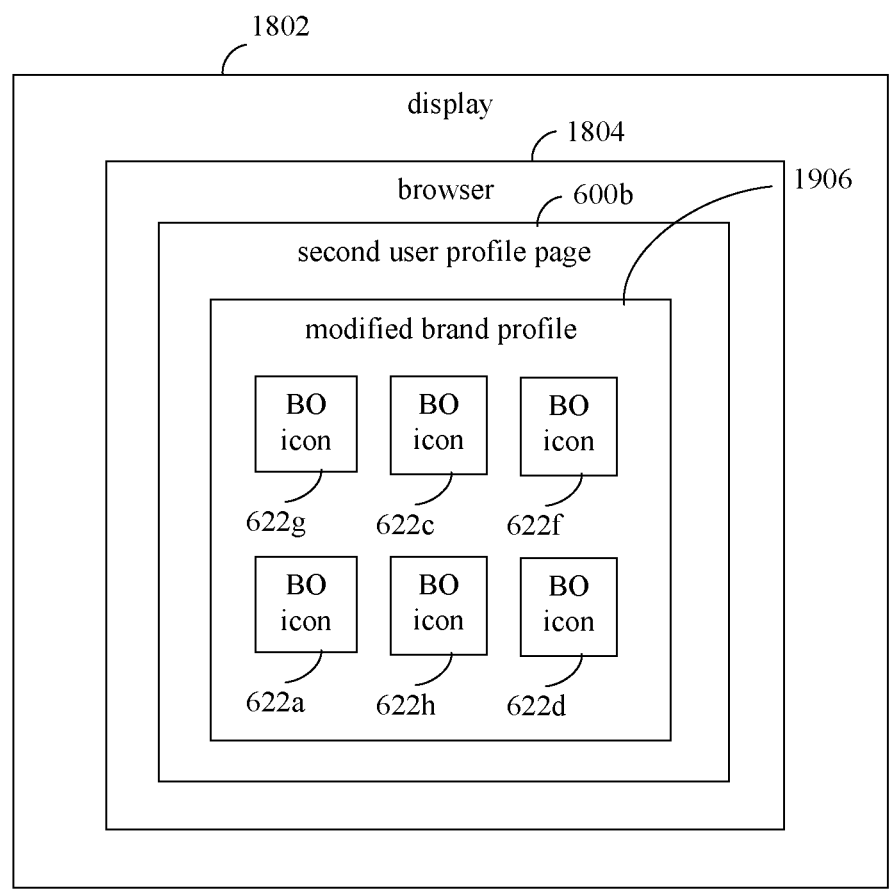

FIG. 19 shows a block diagram of a display of a user device that displays a sorted brand profile, according to an embodiment of the present invention.

Figure 20:
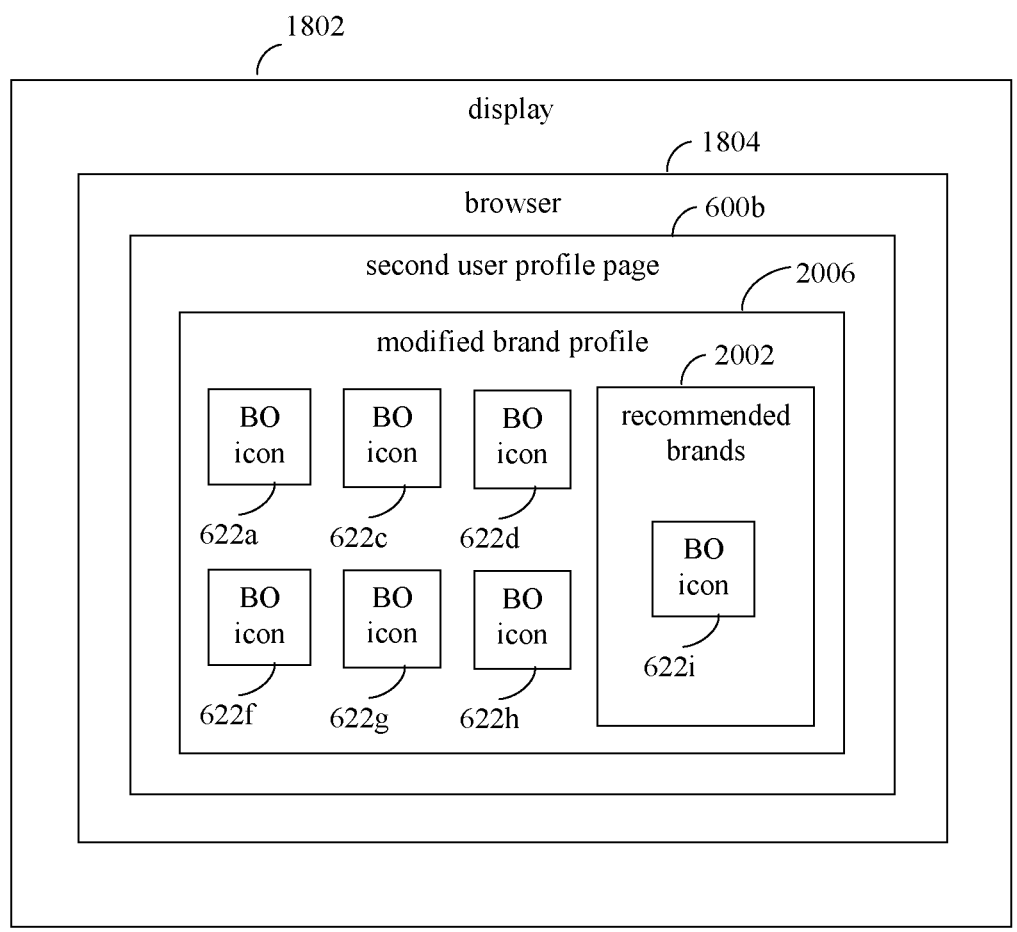

FIG. 20 shows a block diagram of a display of a user device that displays a recommended brand object, according to an embodiment of the present invention.

Figure 21:
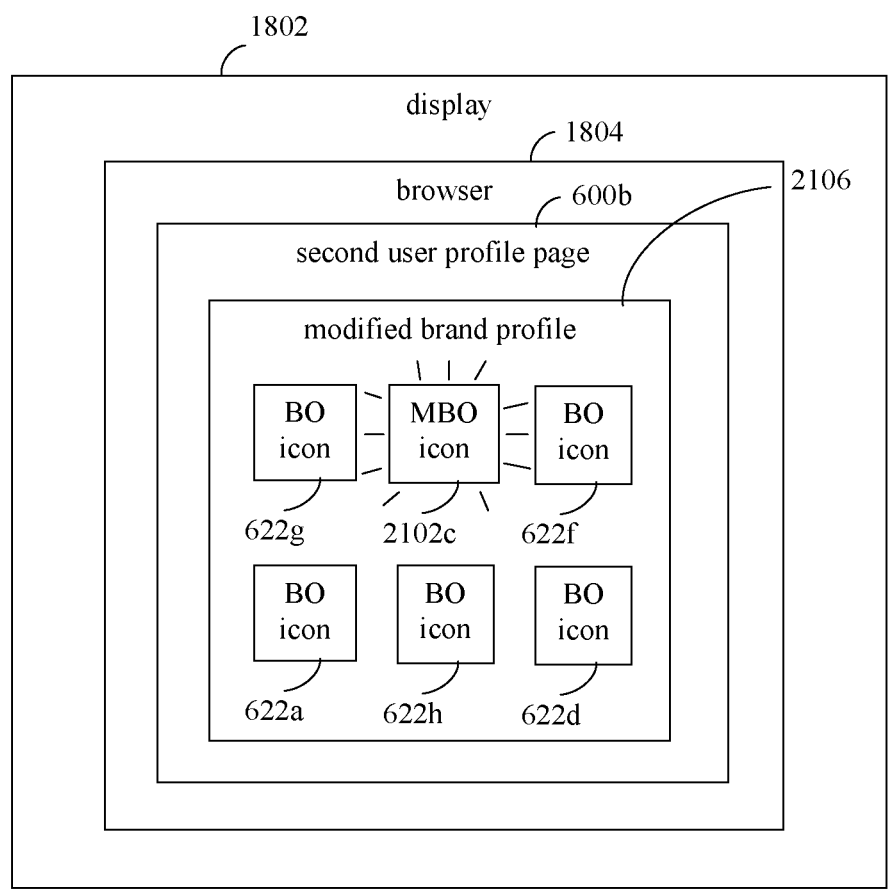

FIG. 21 shows a block diagram of a display of a user device that displays a modified brand object, according to an embodiment of the present invention.

Figure 22:
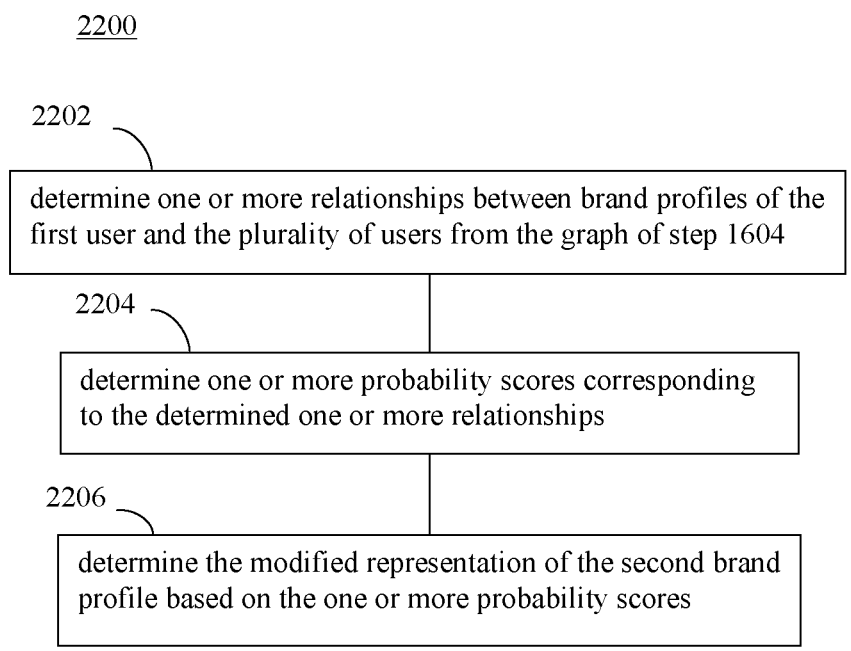

FIG. 22 shows a flowchart for generating a modified brand profile, according to an example embodiment of the present invention.

Figure 23:
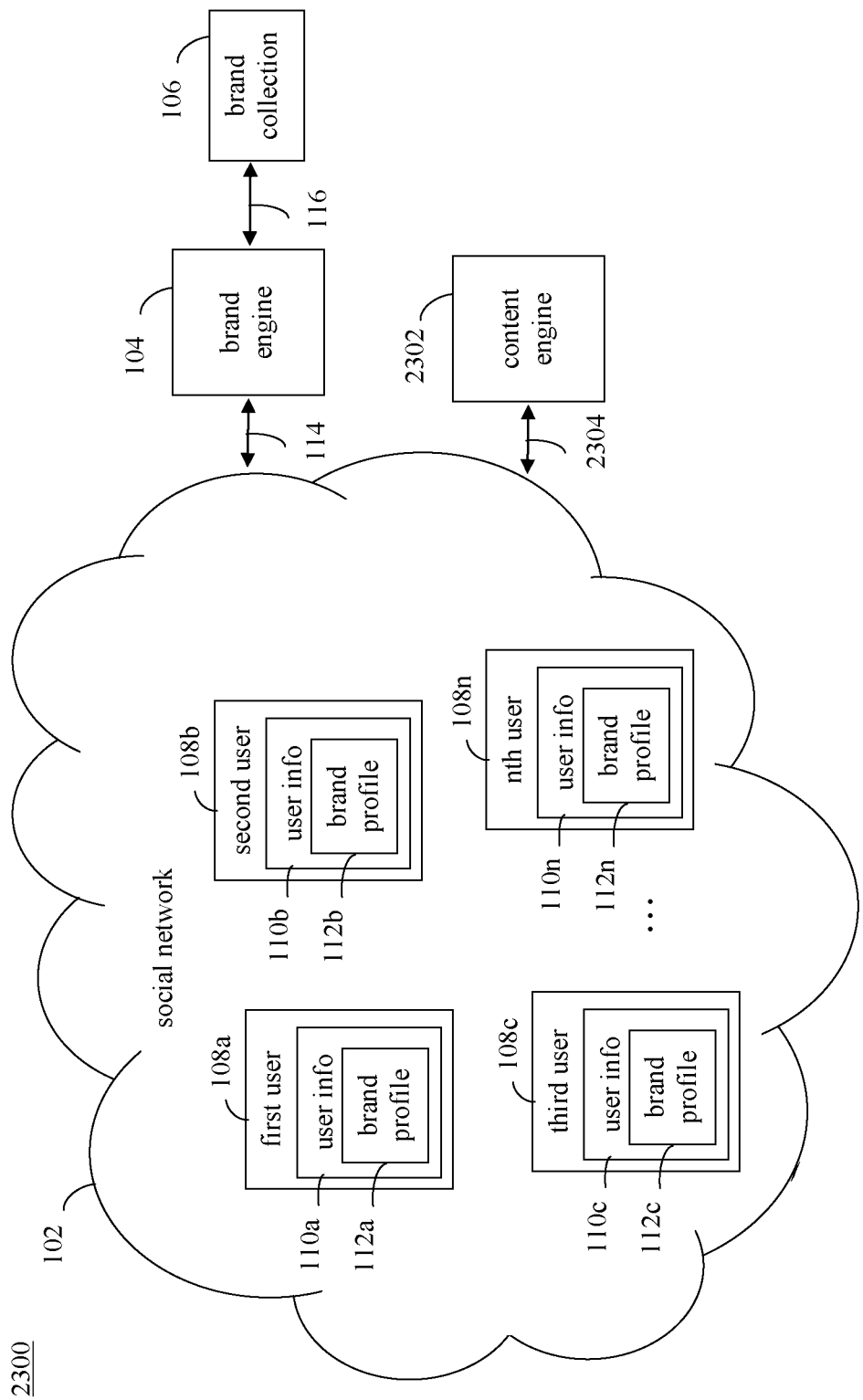

FIG. 23 shows a block diagram of a brand marketing and social network system, according to an example embodiment of the present invention.

Figure 24:
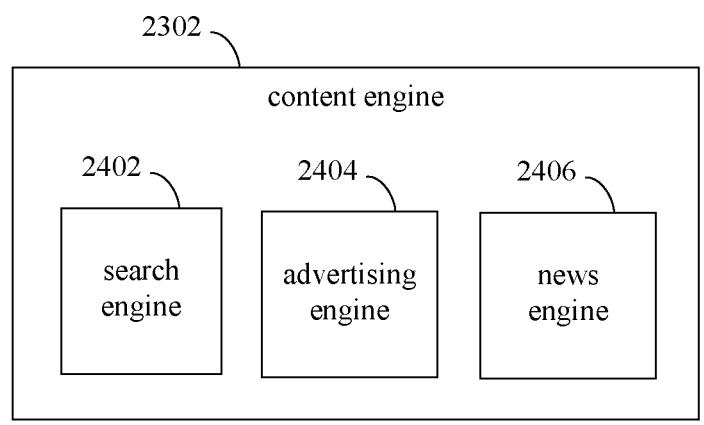

FIG. 24 shows a block diagram of a content engine, according to an example embodiment.

Figure 25:
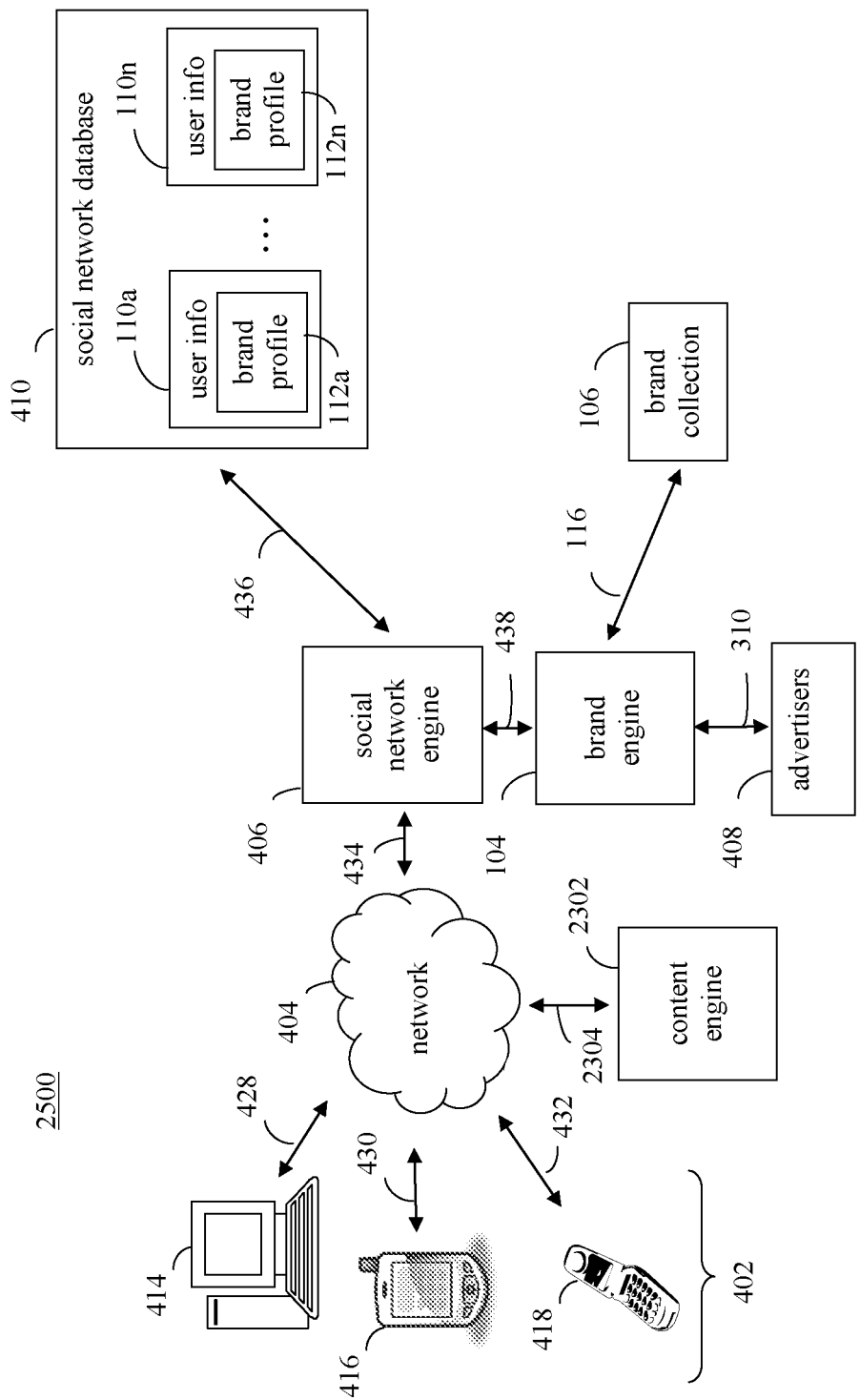

FIG. 25 shows a block diagram of a brand marketing and social network system, according to an example embodiment of the present invention.

Figure 26:
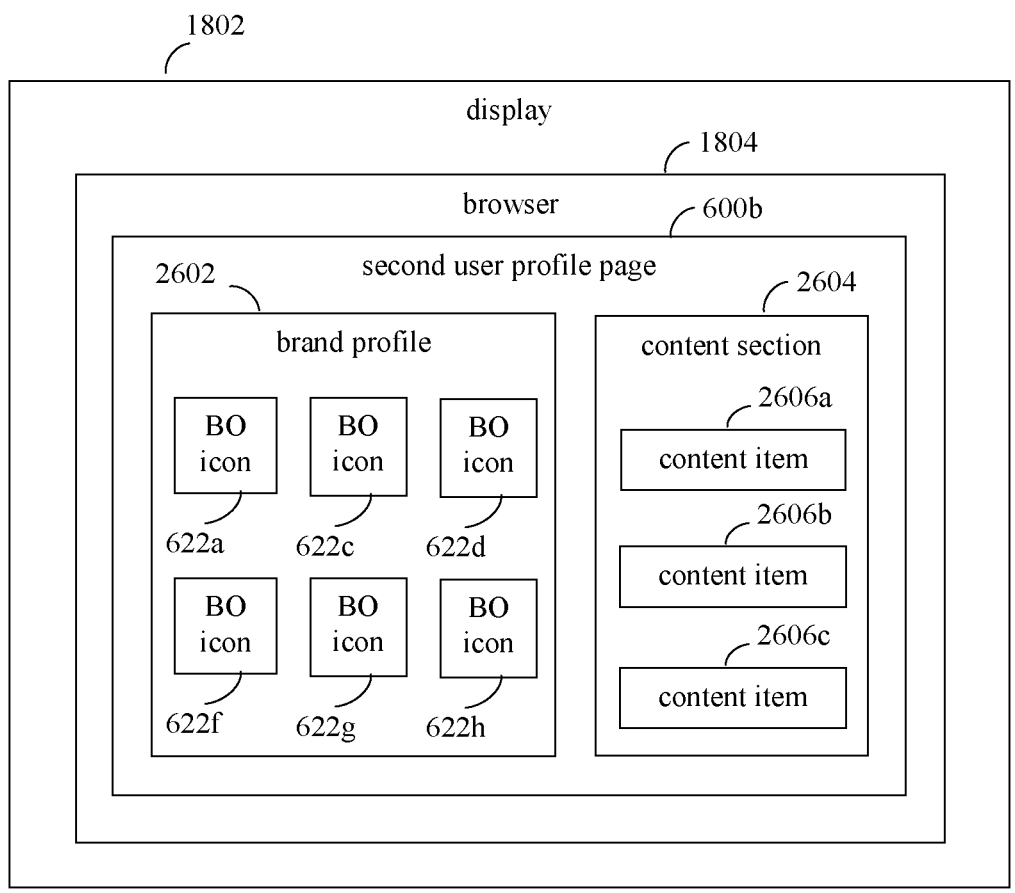

FIG. 26 shows a block diagram of a display of a user device that displays a brand profile and content, according to an embodiment of the present invention.

Figure 27:
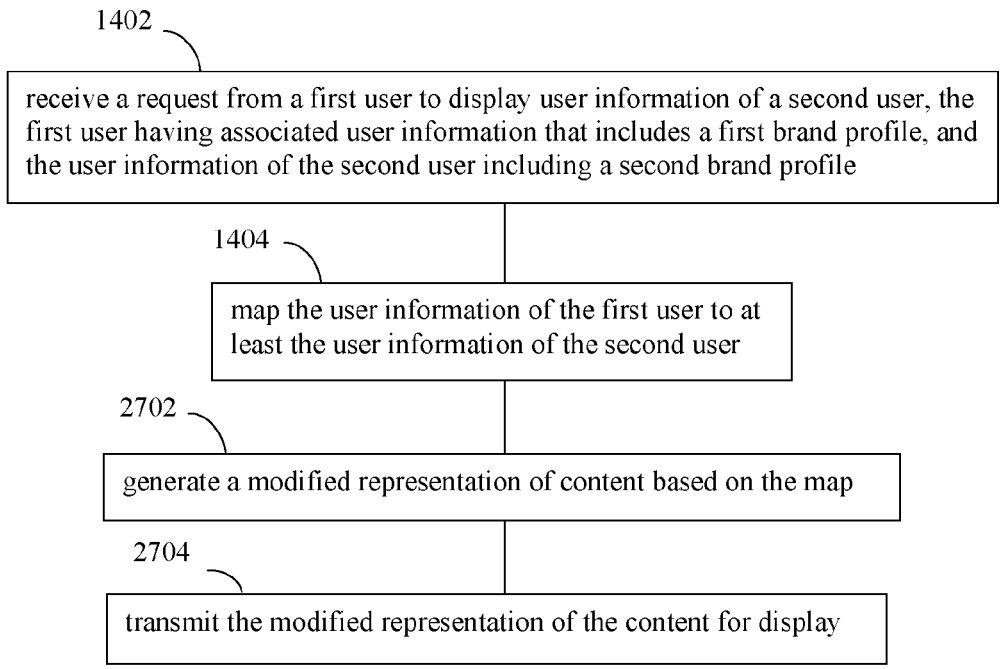

FIG. 27 shows a flowchart for providing content, according to an example embodiment of the present invention.

Figure 28:
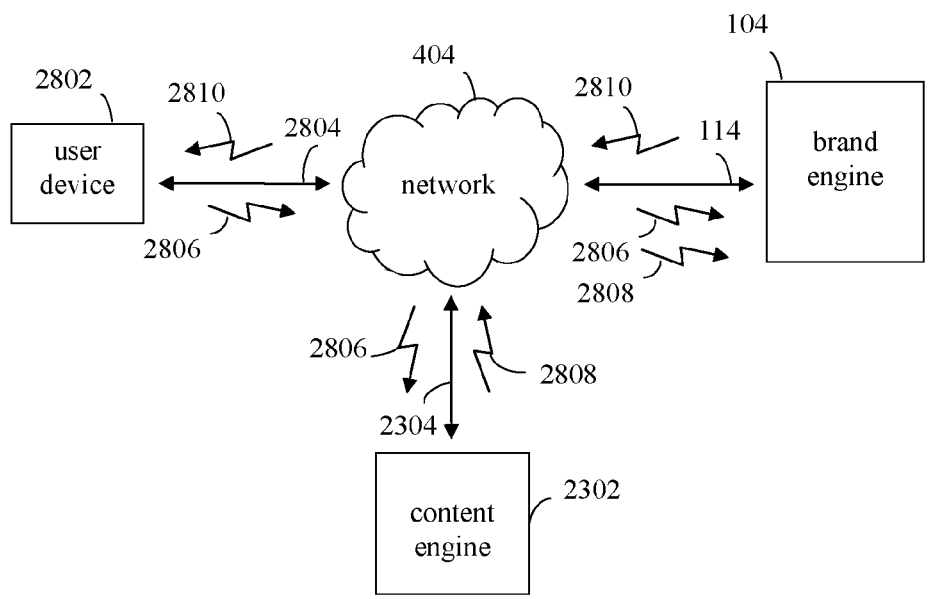

FIG. 28 shows a brand advertising and social network system, according to an example embodiment of the present invention.

Figure 29:
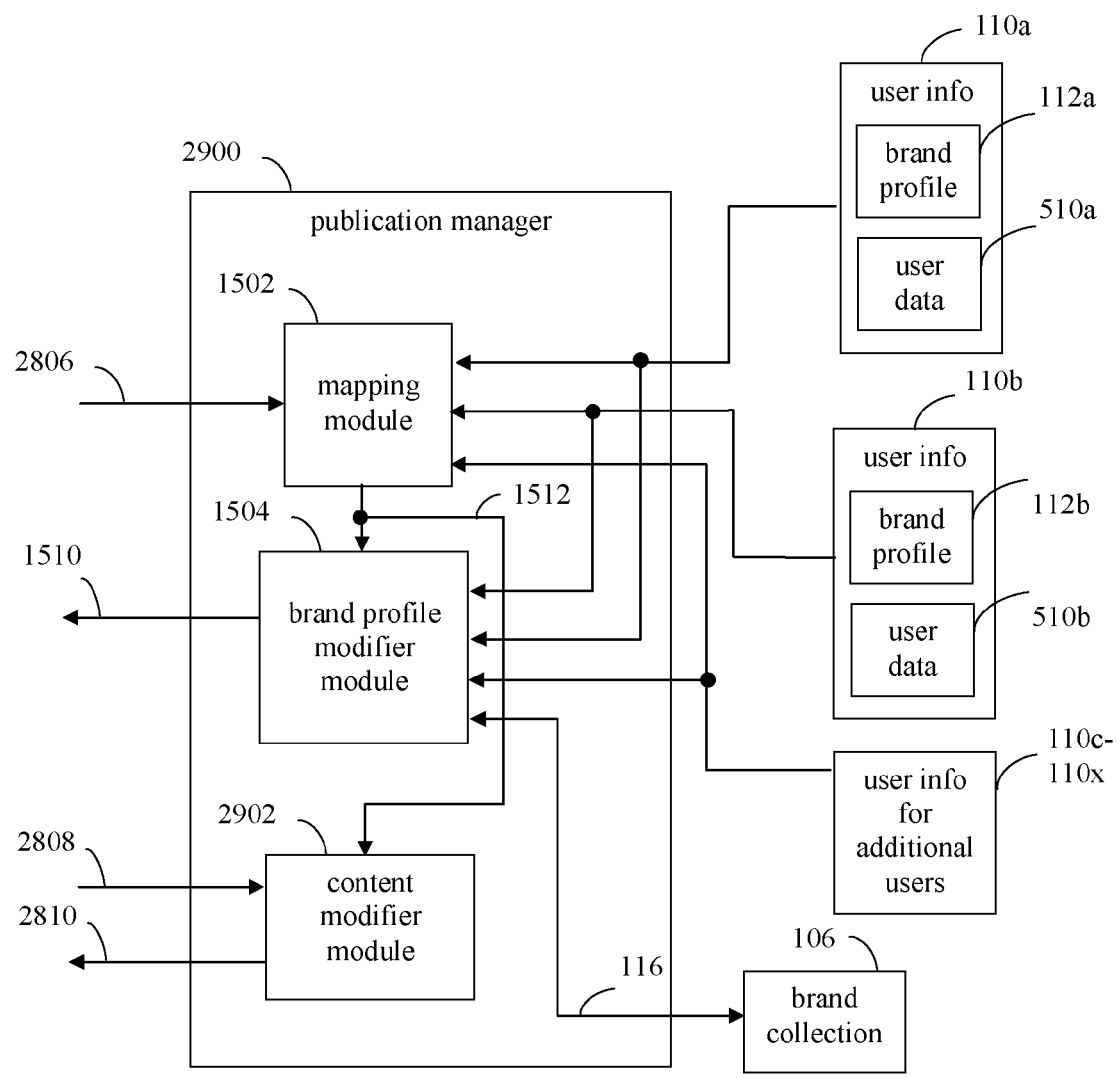

FIG. 29 shows a block diagram of a publication manager, according to an embodiment of the present invention.

Figure 30:
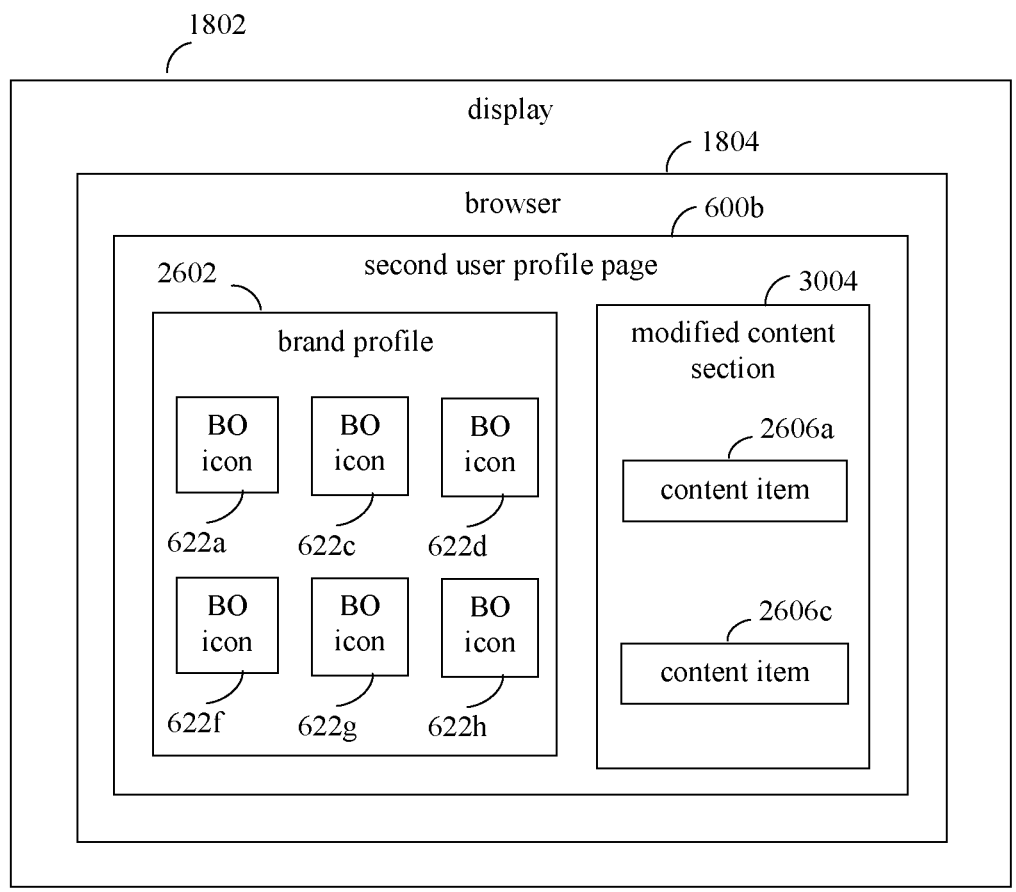

FIG. 30 shows a block diagram of a display of a user device that displays filtered content items, according to an example embodiment of the present invention.

Figure 31:
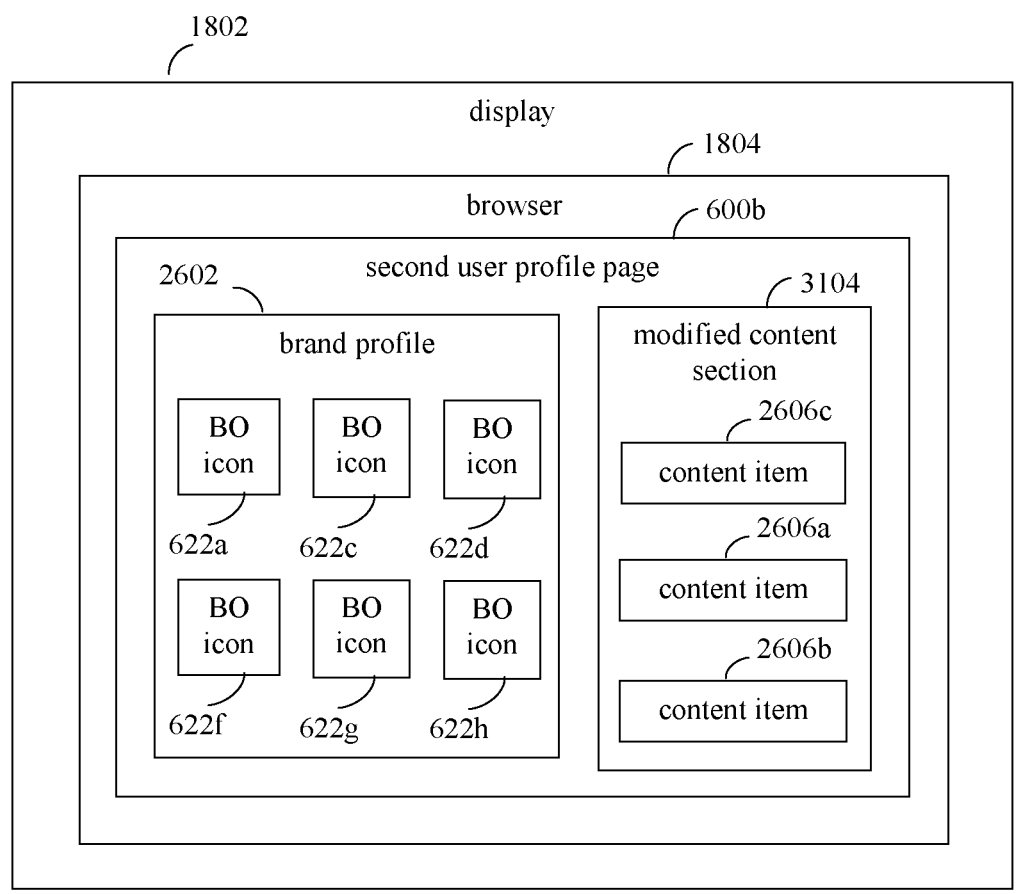

FIG. 31 shows a block diagram of a display of a user device that displays sorted content items, according to an embodiment of the present invention.

Figure 32:
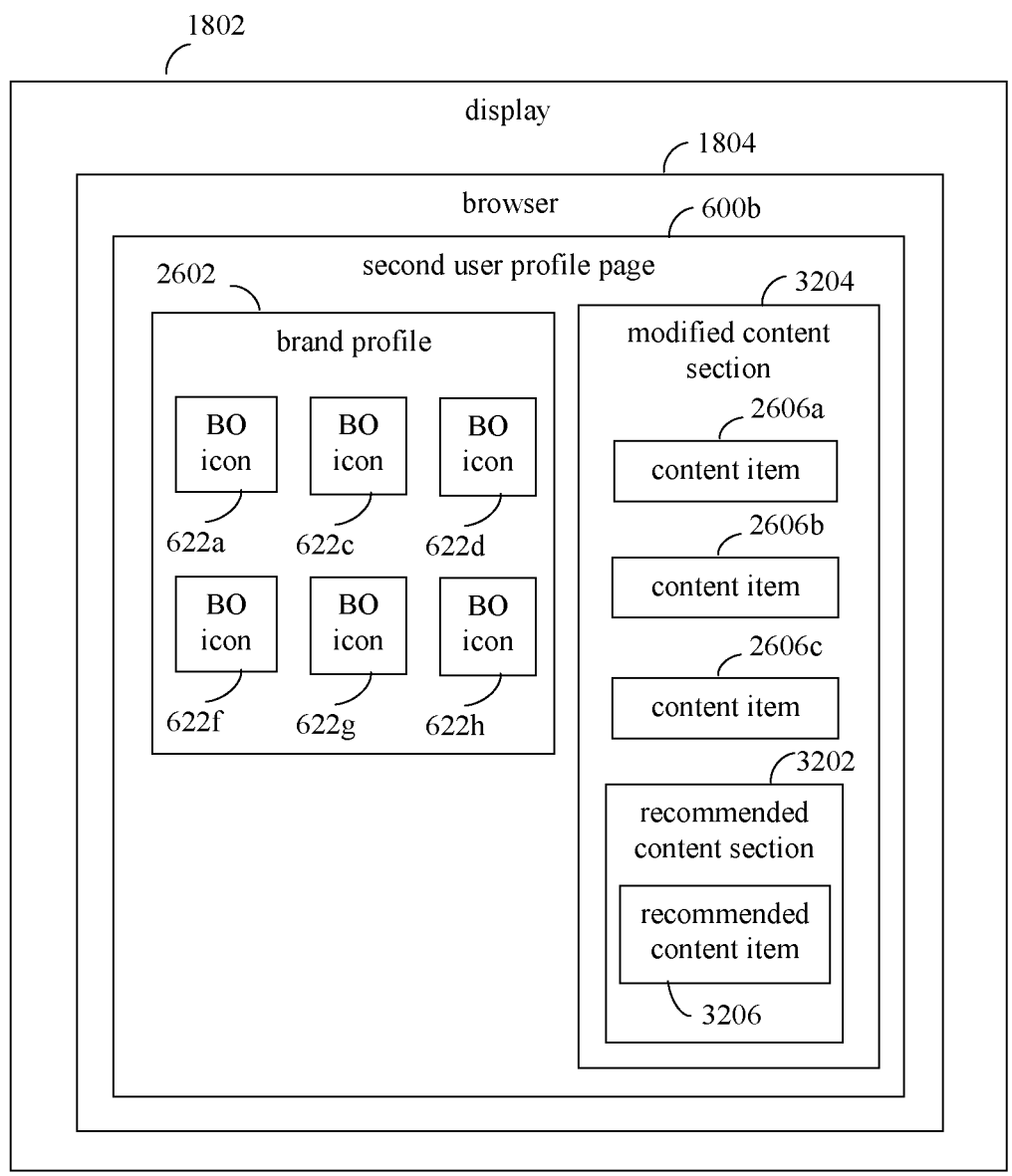

FIG. 32 shows a block diagram of a display of a user device that displays a recommended content item, according to an embodiment of the present invention.

Figure 33:
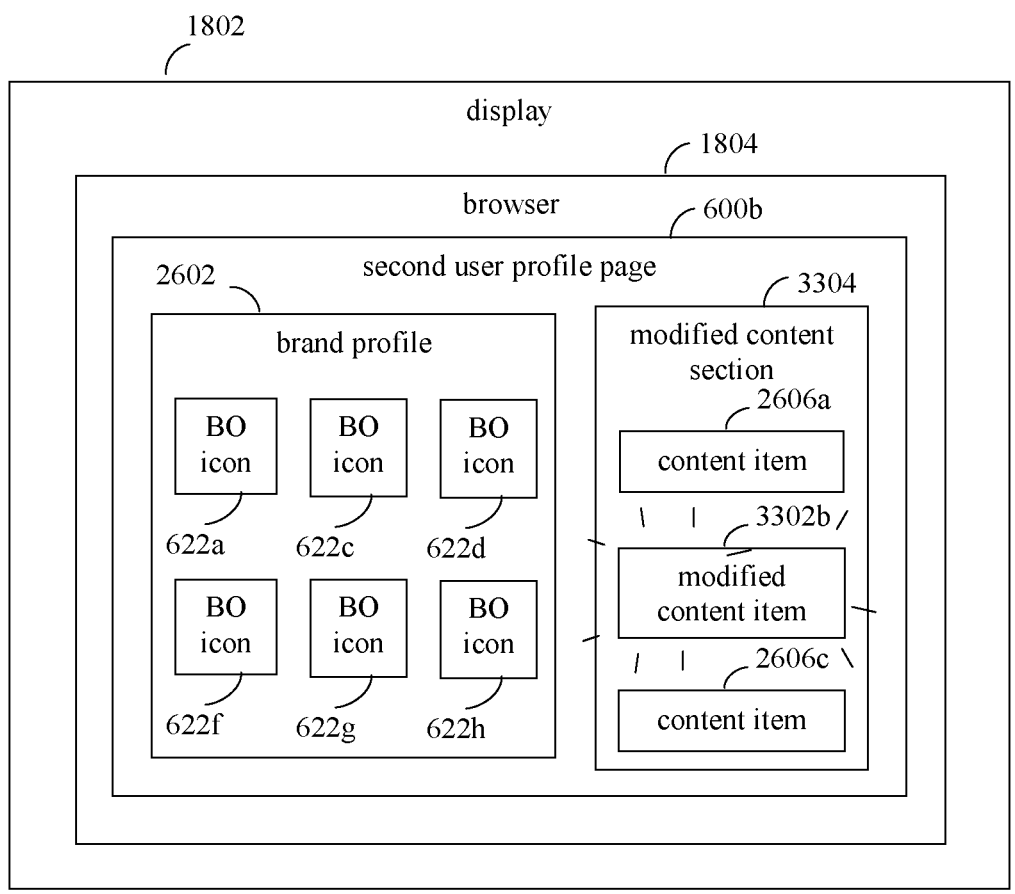

FIG. 33 shows a block diagram of a display of a user device that displays modified content items, according to an embodiment of the present invention.

Figure 34:
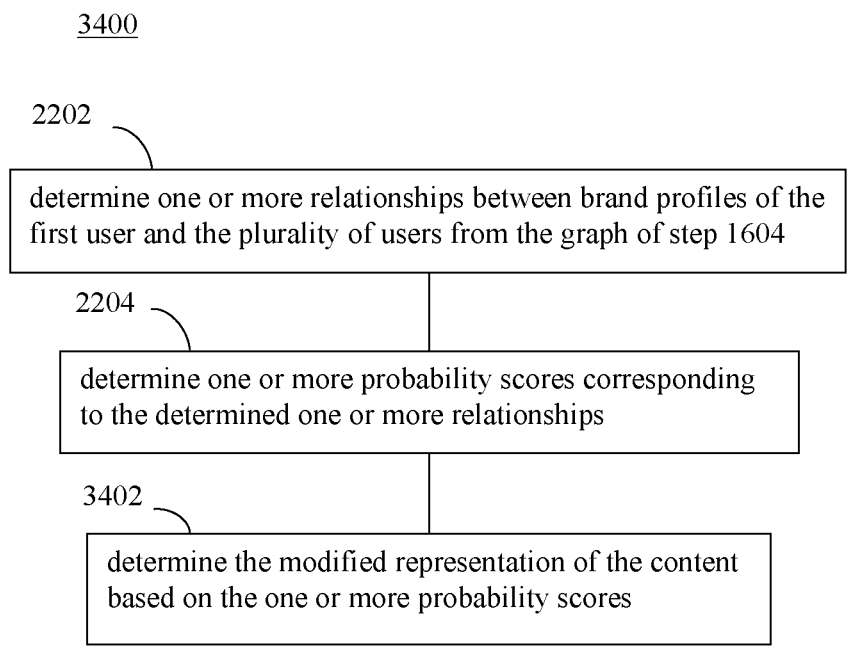

FIG. 34 shows a flowchart for generating a modified content section, according to an example embodiment of the present invention.

Figure 35:
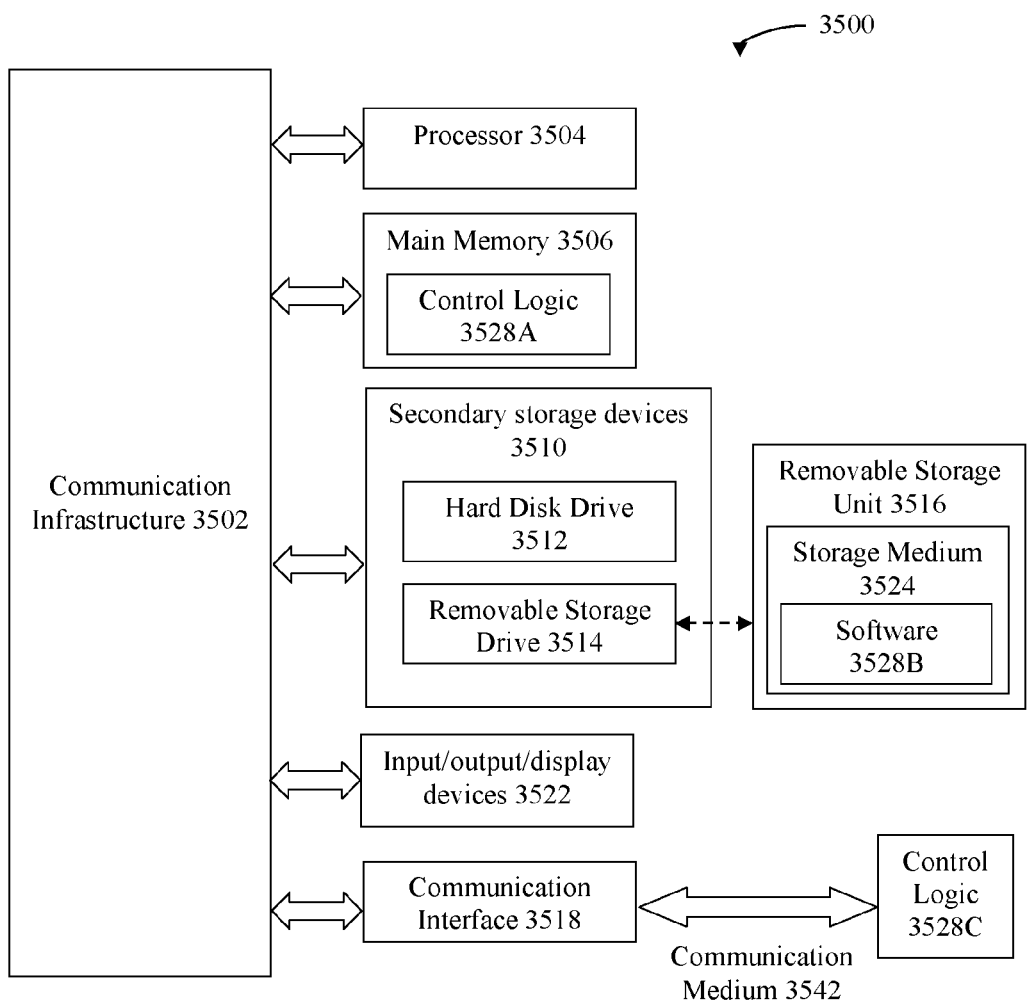

FIG. 35 shows a block diagram of an example computer system in which embodiments of the present invention may be implemented.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

I. Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

II. Brand Engine and Social Network Embodiments

Figure 1:
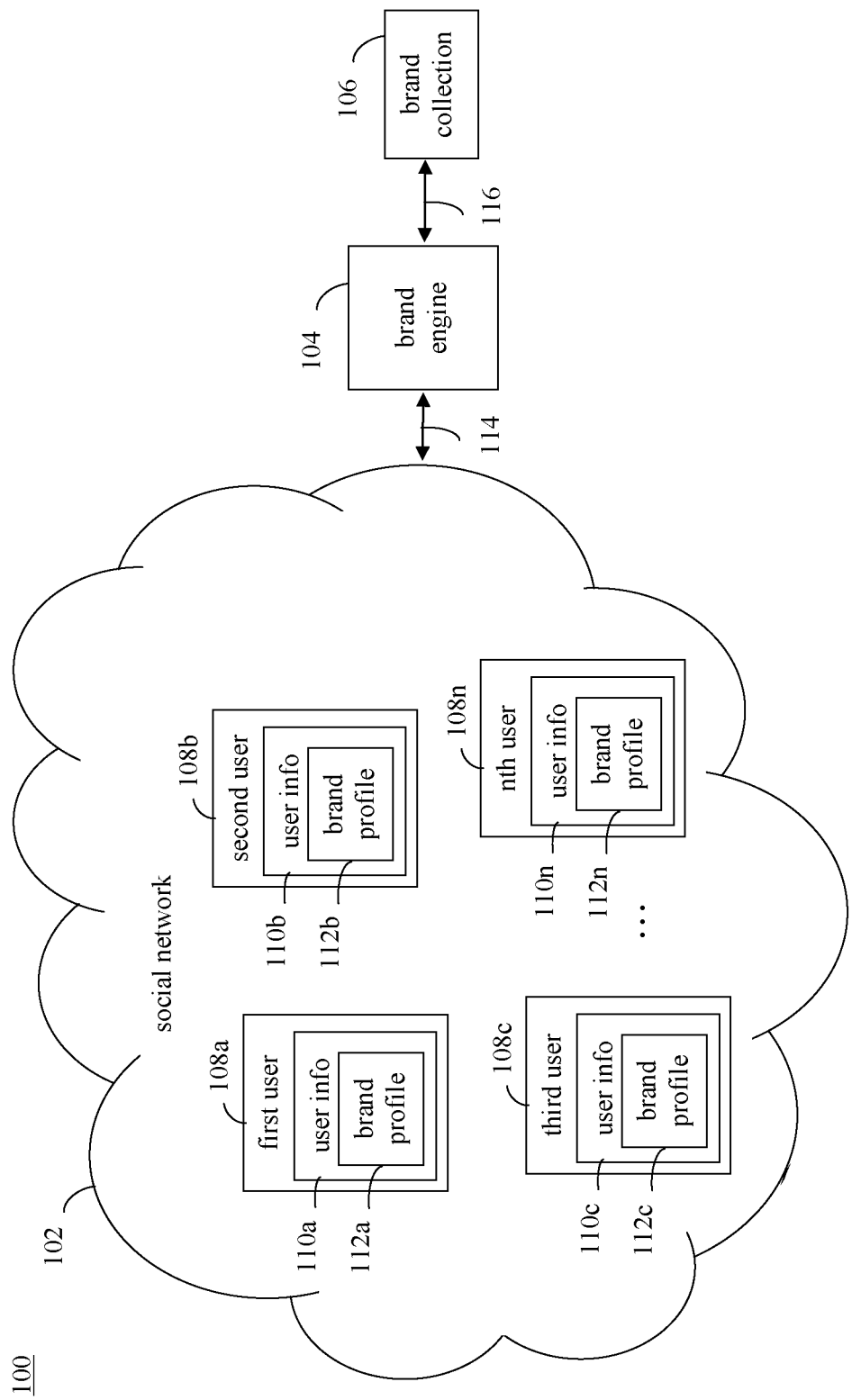
FIG. 1 shows a block diagram of a brand marketing and social network system, according to an example embodiment of the present invention.

Embodiments of the present invention enable brands to be promoted in an online social network environment. Such embodiments leverage social networks to provide more relevant and interesting advertising to the social network participants. FIG. 1 shows a block diagram of a brand marketing and social network system 100, according to an example embodiment of the present invention. Brand marketing and social network system 100 enables users and brands to interact. As shown in FIG. 1, brand marketing and social network system 100 includes a social network 102, a brand engine 104, and a brand collection 106. Brand engine 104 is communicatively coupled to social network 102 by a first communication interface 102, and brand engine 104 is communicatively coupled to brand collection 106 by a second communication interface 116. Each of the elements of system 100 is described in detail below. Further description of the elements of system 100 is provided in subsequent sections.

Social network 102 is an online social network or a combination of social networks, that includes a community of users 108 (network participating persons). First-nth users 108a-108n are shown in social network 102 in FIG. 1. Social network 102 may include any number of users 108, including hundreds, thousands, or even millions of user 108. Users 108 may interact with each other in social network 102 using corresponding electronic devices (e.g., computers, cell phones, etc.), as described in detail further below. Social network 102 operates within a communications network, such as a local area network (LAN), a wide area network (WAN), or a combination of networks, such as the Internet. For example, social network 102 may be based in the World Wide Web. The communication network enables communications between users 108. Social network 102 may enable one or more ways for users to interact, including enabling communications between users 108 through one or more of blogging, discussion groups, email, file sharing, instant messaging, online chat, video, voice chat, and/or other user communication mechanisms.

As shown in FIG. 1, each user 108 has corresponding user information 110. User information 110 may include any information about the respective user 108 that the user may desire to make accessible to other users 108 of social network 102. For example, user information 110 may include a name and/or an alias, a representative image (e.g., a photographic image and/or avatar), contact information, status information, a list of interests, and/or other information regarding the respective user 108. User information 110 may be configured to support a self-description page (also referred to as a "user profile page") for each user 108, which may be displayed as a web page or in other form. In an embodiment, user information 110 may include a list of friends of the user. For example, user 108a may include users 108b and 108c in a friends list maintained in user information 110a of user 108a. In an embodiment, social network 102 may enable each user 108 to link their profile pages with the profile pages of their listed friends.

Brand collection 106 is a database or any other data structure that contains information representative of one or more brands. As shown in FIG. 1, brand engine 104 interfaces brand collection 106 with social network 102. In an embodiment, brand collection 106 may include brand information packaged in a manner as to enable information regarding any particular brand to be provided to users 108 through brand engine 104. For example, brand collection 106 may store brand information in the form of "brand objects" (which may be referred to as "brandies"). Examples of brand collection 106 and brand objects are described in further detail below.

As shown in FIG. 1, user information 110 for each user 108 may include a brand profile 112. Brand profile 112 is a list or any other data structure that indicates one or more brands of interest to the respective user 108. For example, brand profile 112b of user 108b may indicate that user 108b is interested in brands A, B, and C, while brand profile 112c of user 108c may indicate that user 108c is interested in brands B, C, and D. A brand may be selected by a user 108 from brand collection 106 to be included in the user's brand profile 112. Alternatively, a brand may be selected by the user 108 from a brand profile 112 of another user 108 to be included in the user's brand profile 112. For example, user 108c may select a brand from brand profile 112a of user 108a to include in brand profile 112c of user 108c.

Note that user information 110a-110n of users 108a-108n may be stored in a centralized storage or in distributed storage. For example, in one embodiment, user information 110a-110n may be stored in a common storage structure. In another embodiment, user information 110 may be stored locally to each corresponding user 108 (e.g., stored on a local hard drive for each user 108). Furthermore, user information 110 and brand profile 112 may be stored together, or at separate storage locations.

As shown in FIG. 1, brand engine 104 interfaces brand collection 106 with social network 102 through first and second communication interfaces 114 and 116. Brand engine 104 is communicatively coupled with social network through first communication interface 114, and is communicatively coupled with brand collection 106 through second communication interface 116. First and second communication interfaces 114 and 116 may include any type and/or combination of communication links, including wired and/or wireless links, such as IEEE 802.11 wireless LAN (WLAN) wireless links, Ethernet links, USB links, etc. In an embodiment, brand engine 104 may include one or more network interfaces, including wired or wireless interfaces, such as an as IEEE 802.11 wireless LAN (WLAN) wireless interface, an Ethernet interface, a USB interface, etc.

In an embodiment, brand engine 104 enables users 108 to obtain brand objects from brand collection 106 for inclusion in brand profiles 112. For instance, brand engine 104 may provide an interface (e.g., a website) through which users 108 can select brand objects from brand collection 106. Users 108 may view and/or interact with the brand objects in their own brand profile 112, and may view and/or interact with the brand objects in brand profiles 112 of other users 108. For example, users 108 may be able to view and/or interact with brand objects in their own profile page, and in profile pages of other users 108. In this manner, information regarding a brand represented by a brand object may be provided from one user 108 to another user 108 without requiring action from the advertiser (other than providing the brand object to brand collection 106).

Example embodiments for brand marketing and social network system 100, and the elements thereof, are described in the following subsections.

A. Example Brand Collections

A brand is a product, service, or any other real world entity or information object which has an identity. Brand collection 106 shown in FIG. 1 may be a database or any other suitable data structure that may be configured to contain information representative of one or more such brands. Brand collection 106 may include brand information packaged in a manner as to enable brands to be provided to user 108 through brand engine 104, and to be shareable between users 108.

Figure 2:
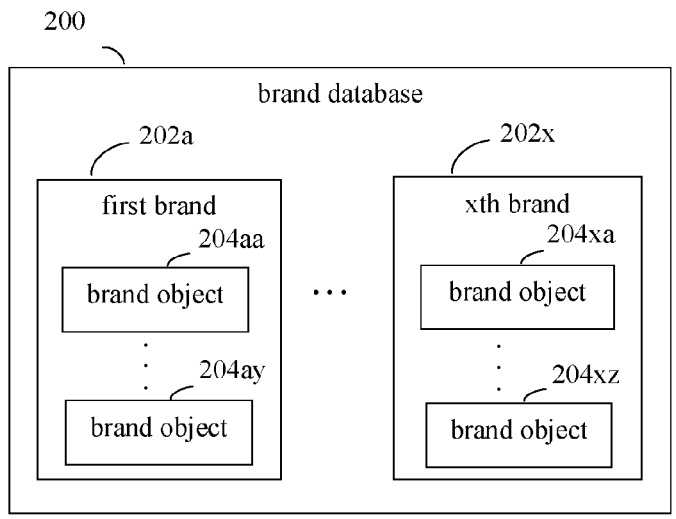
FIG. 2 shows a block diagram of an example brand database, according to an embodiment of the present invention.

For example, FIG. 2 shows a brand database 200, which is an example of brand collection 106 shown in FIG. 1, according to an embodiment of the present invention. As shown in FIG. 2, brand database 200 includes information related to first-xth brands 202a-202x. Information relating to any number of brands 202 may be stored in brand database 200. In the example of FIG. 2, brand information for each brand 202 is present in the form of one or more brand objects 204. For example, as shown in FIG. 2, brand 202a has brand objects 204aa-204ay, and brand 202x has brand objects 204xa-204xz.

A brand object 204 includes one or more files and/or other data structures containing information representative of an aspect of the corresponding brand 202. For example, if brand 202a is the BMW™ brand, various brand objects 204 may be present that represent aspects of the BMW™ brand. For instance, brand object 204aa may be representative of the BMW™ brand generally, brand object 204ab may be representative of the BMW Z4 Coupe, brand object 204ac may be representative of the BMW 1 Series Convertible, etc.

A brand object 204 may represent a brand in the form of one or more of text, image(s), video (e.g., video files; such as an MPEG format), audio (e.g., sound files; such as WMA or WAV formats)), and/or other media forms. Brand objects 204 may be interactive or non-interactive. For example, in an embodiment, a brand object 204 may be a multi-media object or a rich media object. A brand object 204 may include software code, such as Javascript™, C++, ActionScript (e.g., in an Adobe Flash implementation), and/or other code, to enable desired functionality and/or interactivity. When listed in user information 210 of a user 108 (shown in FIG. 1), a brand object 204 may be displayed in the profile page of the user. A brand object 204 may be displayed as text, as an image (e.g., as an icon) and/or as a video, and sound may optionally be generated by an associated audio file.

A brand object 204 is a shareable expression of brand identity. Brand objects 204 may be shared among users 108 in social network 102. For example, users 108 may display brand objects 204 in their respective user/brand profiles. Other users 108 in social network 102 who view the displayed brand objects 204 may copy to their own user/brand profiles one or more of the displayed brand objects 204 that are of interest. A user's particular collection of brand objects 204 may be reflective of the personality, interests, hobbies, etc., of the user.

In an embodiment, a brand object 204 may be monetizable. For example, the display of a brand object 204 may cause advertising revenue to be paid an operator/owner of brand engine 104, to an entity that created and/or supplied the brand object, to a user 108 that includes the displayed instance of the brand object in their user/brand profile, and/or to other entity.

In embodiments, brand collection 106 shown in FIG. 1 may be stored in any suitable storage medium, including mass storage such as optical discs and/or magnetic storage (e.g., hard disks), and/or in memory devices (e.g., volatile or non-volatile random access memory (RAM)).

B. Example Brand Engines

In embodiments, brand engine 104 enables users 108 to obtain brand objects from brand collection 106 for inclusion in brand profiles 112. Brand engine 104 enables users 108 to share the brand objects, and manages display of the brand objects in brand profiles 112 for users 108. Brand engine 104 may be implemented in hardware, software, firmware, or any combination thereof. For example, brand engine 104 may be implemented in one or more computer systems (e.g., servers) containing one or more processors that execute code to perform functions of brand engine 104.

Figure 3:
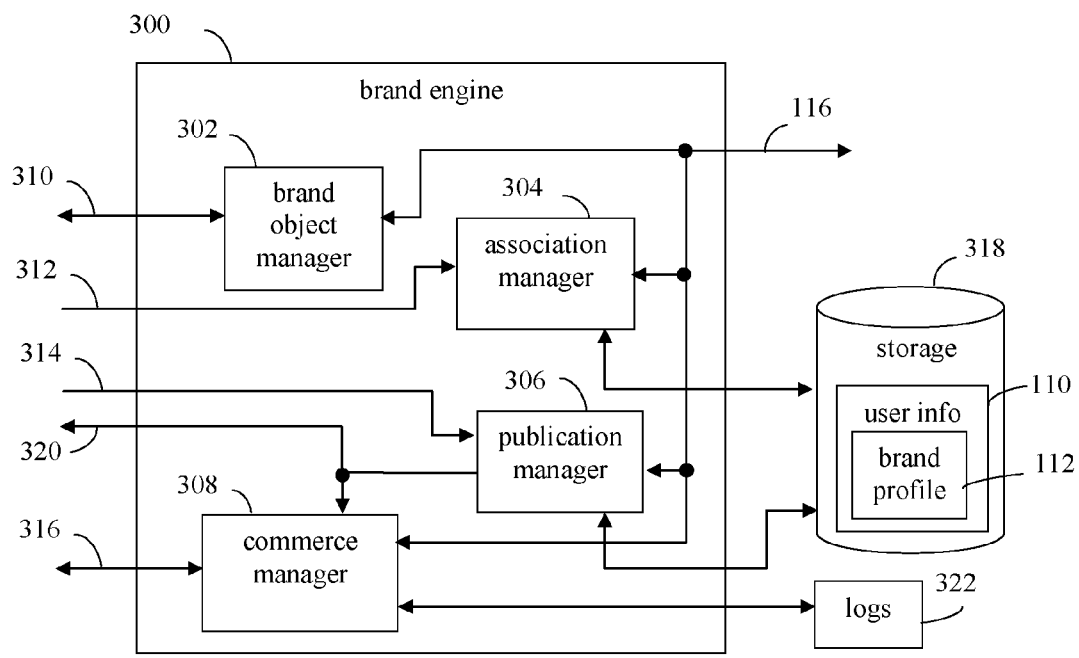
FIG. 3 shows a block diagram of an example brand engine, according to an embodiment of the present invention.

FIG. 3 shows a block diagram of a brand engine 300, which is an example of brand engine 104 shown in FIG. 1, according to an example embodiment of the present invention. As shown in FIG. 3, brand engine 300 includes a brand object manager 302, an association manager 304, a publication manager 306, and a commerce manager 308. These elements of brand engine 300 are described in detail as follows.

Brand object manager 302 manages the availability of brand objects by brand engine 300. Advertisers and/or other entities (e.g., brand managers) that may create brand objects may communicate with brand object manager 302 over communication interface 310 to provide the generated brand objects for inclusion in brand collection 106 (shown in FIG. 1). Furthermore, brand object manager 302 may enable the advertisers and/or other entities to access the brand objects present in brand collection 106 in order to make modifications to the brand objects, and/or to remove the brand objects from brand collection 106 if needed.

In an embodiment, users 108 in social network 102 may be enabled by brand object manager 302 to view, add, modify, and/or delete brand objects 204 in brand collection 106. Brand object manager 302 may provide access to a brand object template that may be used by advertisers, users 108, and/or other entities to generate brand objects 204.

Association manager 304 enables associations to be formed between users 108 and brand objects 204, and monitors such associations. Association manager 304 may receive a brand profile modification request 312 (e.g., over communication link 114) from users 108 to modify a corresponding brand profile 112, such as by adding or deleting a brand object 204 from a brand profile 112. For example, referring to FIGS. 1 and 2, user 108a may desire to add brand object 204ay to the brand profile of first user 108a (brand profile 112a). Association manager 304 is configured to modify brand profile 112a according to brand profile modification request 312, including being configured to add brand object 204ay to brand profile 112a (or to remove brand object 204ay from brand profile 112a, if so requested).

Association manager 304 may be configured to access brand profiles 112, including brand profile 112a, from any storage configuration and/or location, for modification. For example, brand profiles 112 may be stored in a centralized storage location (e.g., a storage 318 shown in FIG. 3), at a separate storage location for each of users 108 (e.g., in user devices of users 108), or in other location(s).

Note that brand profile modification request 312 may be generated in various ways. For example, brand object manager 302 may enable first user 108a to browse brand objects 202aa-202ay of brand 202a in brand database 300 shown in FIG. 2. First user 108a may select brand object 204ay in brand database 300, causing an initiation of brand profile modification request 312. Alternatively, first user 108a may view brand profile 112b of second user 108b (e.g., as displayed in a profile page of second user 108b). First user 108a may select brand object 204ay displayed in viewed brand profile 112b, which may initiate brand profile modification request 312.

Publication manager 306 manages publication of brand profiles 112 of users 108, such as when a user 108 displays a profile page. A brand profile 112 to be displayed may be the user's own brand profile 112 or a brand profile 112 of another user 108 of social network 102. Publication manager 306 may receive a brand profile publication request 314 (e.g., over communication link 114) indicating a request from a user 108 to display a brand profile 112. Publication manager 306 may request the brand profile 112 indicated in brand profile publication request 314 from storage 318. Publication manager 306 determines any brand objects present in the requested brand profile 112, accesses the determined brand objects in brand collection 106 (over communication interface 116), and provides the determined one or more brand objects 204 to the requesting user 108 in a brand profile publication response signal 320 (e.g., over communication link 114). The requesting user 108 receives brand profile publication response signal 320, which enables the requesting user 108 to display the determined brand objects 204.

Commerce manager 308 performs accounting and commerce functions for brand engine 300. Commerce manager 308 may track interactions of users 108 with brand objects 204, which may optionally be monetized. For example, commerce manager 308 may track displays of brand objects 204 by monitoring brand profile publication signal 320 generated by publication manager 306. Furthermore, commerce manager 308 may track interactions with displayed brand objects 204, such as when a user 108 clicks on a brand object 204 (e.g., to display a brand page). Commerce manager 308 may generate one or more transaction logs 322 to log any generated tracking information. Transaction logs 322 may be stored in storage 318 or in other storage system. The tracked information (e.g., views of brand objects 204, clicks of brand objects 204, etc.) can be used to generate revenue for an entity associated with brand engine 300 (e.g., an operator or owner of brand engine 300).

For example, commerce manager 308 may store cost-per-interaction information, such as cost-per-view and/or cost-per-click information, which can be multiplied by the tracked displays and/or clicks to determine fees to charge to advertisers (and/or other entities) associated with the displayed and/or clicked brand objects. Commerce manager 308 may be configured to communicate with the advertisers (and/or other entities) over communication interface 316 to charge and/or collect fees. For example, commerce manager 308 may transmit charged fees to advertisers over communication interface 316, and may receive/confirm electronic payments over communication interface 316.

Brand object manager 302, association manager 304, publication manager 306 and commerce manager 308 may be implemented in hardware, software, firmware, or any combination thereof. For example, brand object manager 302, association manager 304, publication manager 306 and commerce manager 308 may each be implemented in code configured to execute in one or more processors. Storage 318, when present, may be any suitable storage medium, including mass storage such as one or more optical discs and/or magnetic storage (e.g., hard disks), and/or memory devices (e.g., volatile or non-volatile random access memory (RAM)).

C. Social Network Embodiments

Social network 102 shown in FIG. 1 may be implemented in a variety of ways. For example, in one embodiment, brand engine 104 may be configured to manage all user information 110 for each user 108 of social network 102, as well as manage distribution/sharing of brands. In such an embodiment, brand engine 104 may function as a social network service that manages social network 102. In another embodiment, brand engine 104 may manage distribution/sharing of brands, while at least some of the management of user information 110 for users 108 is performed internal to social network 102.

Figure 4:
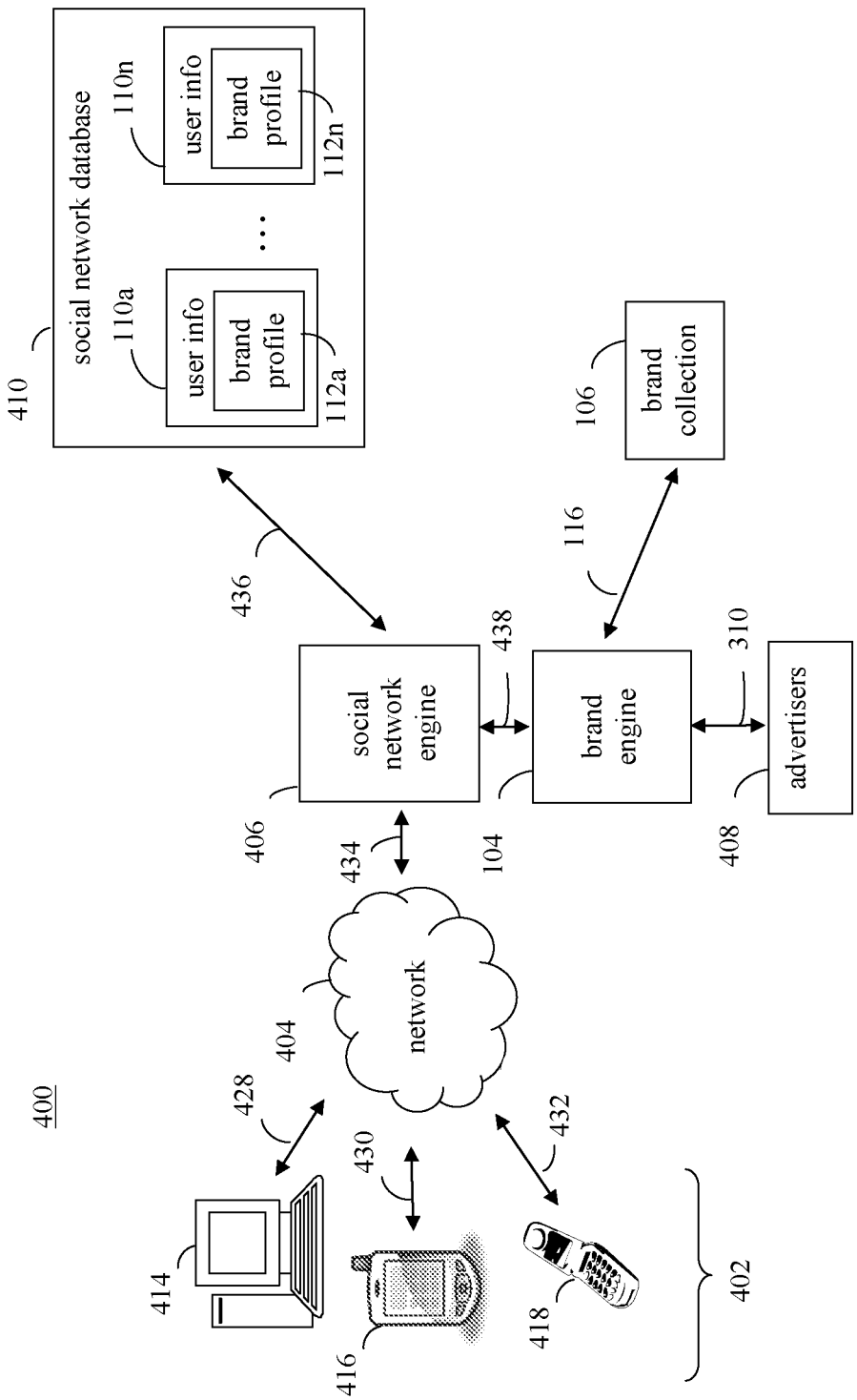
FIG. 4 shows a block diagram of an example of the brand marketing and social network system shown in FIG. 1, according to an embodiment of the present invention.

For example, FIG. 4 shows a block diagram of a brand marketing and social network system 400, which is an example of system 100 shown in FIG. 1, according to an example embodiment of the present invention. As shown in FIG. 4, brand marketing and social network system 400 includes user devices 402, a network 404, a social network engine 406, brand engine 104, advertisers 408, a social network database 410, and brand collection 106. In FIG. 4, user devices 402, network 404, social network engine 406, and social network database 410 represent an example embodiment of social network 102 of FIG. 1. In the embodiment of FIG. 4, social network engine 406 performs at least a portion of the social network management functions performed in system 400.

As shown in FIG. 4, social network engine 406 is communicatively coupled with user devices 402 through network 404. Network 404 may be a LAN, a WAN, or combination of networks, such as the Internet. Three example devices are shown as user devices 402 in FIG. 4, for purposes of illustration. User devices 402 may include hundreds, thousand, or even millions of user devices. Example user devices 402 include a desktop computer 414, a mobile computing device 416, and a mobile phone 418. Desktop computer 414 may be any type of stationary computer mentioned herein or otherwise known, including a personal computer. Mobile computing device 416 may be any type of mobile computing device, including a mobile computer (e.g., a Palm® device, a personal digital assistant (PDA), a laptop computer, a notebook computer, etc.) or mobile email device (e.g., a RIM Blackberry® device). Mobile phone 418 may be any type of mobile phone, including a cell phone. User devices 402 may include any number and type of devices that users may use to interact with social network engine 406 and/or brand engine 104, including or alternative to the example user devices shown in FIG. 4.

Each user device may communicate with social network engine 406 through a corresponding communication link. For example, as shown in FIG. 4, desktop computer 414 is communicatively coupled with network 404 through a first communication interface 428, mobile computing device 416 is communicatively coupled with network 404 through a second communication interface 430, and mobile phone 418 is communicatively coupled with network 404 through a third communication interface 432. Social network engine 406 is shown communicatively coupled with network 404 through a fourth communication interface 434. First-fourth communication interfaces 428, 430, 432, and 434 may include any type or combination of communication links, including wired and/or wireless links, such as IEEE 802.11 wireless LAN (WLAN) wireless links, cellular network links, wireless personal area network (PAN) links (e.g., Bluetooth™ links), Ethernet links, USB links, etc.

Social network engine 406 is a social network service that enables the formation of communities of users, and manages the user communities. For example, social network engine 406 may be a social networking service that exists on the World Wide Web. Social network engine 406 may enable users of user devices 402 to interact with each other in any number of ways, including through blogging, discussion groups, email, file sharing, instant messaging, online chat, video, voice chat, and/or other techniques. For instance, social network engine 406 may provide a website that enables users of user devices 402 to interact with each other using any of these techniques. In embodiments, social network engine 406 may be a conventional social network service, such as Bebo (www.bebo.com), Classmates.com™ (www.classmates.com), Facebook™, (www.facebook.com), LinkedIn™ (www.linkedin.com), MySpace.com™ (www.myspace.com), Twitter (www.twitter.com), or any other social network service.

Social network engine 406 is communicatively coupled to social network database 410 by a communication interface 436. Social network database 410 stores user information 110 for each user of user devices 402. For instance, as shown in the example of FIG. 4, social network database 410 stores user information 110*a*-110*n*. Social network engine 406 may host one or more self-description pages (also referred to as a "profile page") for each user of user devices 402 based on each user's respective user information 110. In one embodiment, a profile page may be displayed as a web page using a web browser. Social network engine 406 may enable the users to link their profile pages with profile pages of friends, and/or may provide other ways for networks of users to be formed and to interact.

Brand engine 104 is communicatively coupled to advertisers 408 by communication interface 310, and to brand collection 106 by communication interface 116. Advertisers 408 (and/or other entities) may communicate with brand engine 104 over communication interface 310 (e.g., as described above with respect to FIG. 3) to provide brand objects for inclusion in brand collection 106. Communication interface 412 may include any type or combination of communication links, including wired and/or wireless links, such as IEEE 802.11 wireless LAN (WLAN) wireless links, cellular network links, Ethernet links, USB links, etc. In an embodiment, advertisers 408 may communicate with brand engine 104 through network 404 (e.g., the Internet).

Brand engine 104 is communicatively coupled to social network engine 406 by a communication interface 438. In the embodiment of FIG. 4, social network database 410 maintains brand profiles 112*a*-112*n*. Brand engine 104 manages brand profiles 112*a*-112*n* by accessing brand profiles 112*a*-112*n* (and/or the remainder of user information 110*a*-110*n* when desired) contained by social network database 410 through social network engine 406. Furthermore, communications with users of user devices 402 occur through social network engine 406. For instance, brand profile modification request 312, brand profile publication request 314, and brand profile publication response signal 320 (described above with respect to FIG. 3) may be received from/transmitted to social network engine 406 over communication interface 438 rather than directly from/to the users.

D. User Information

Figure 5:
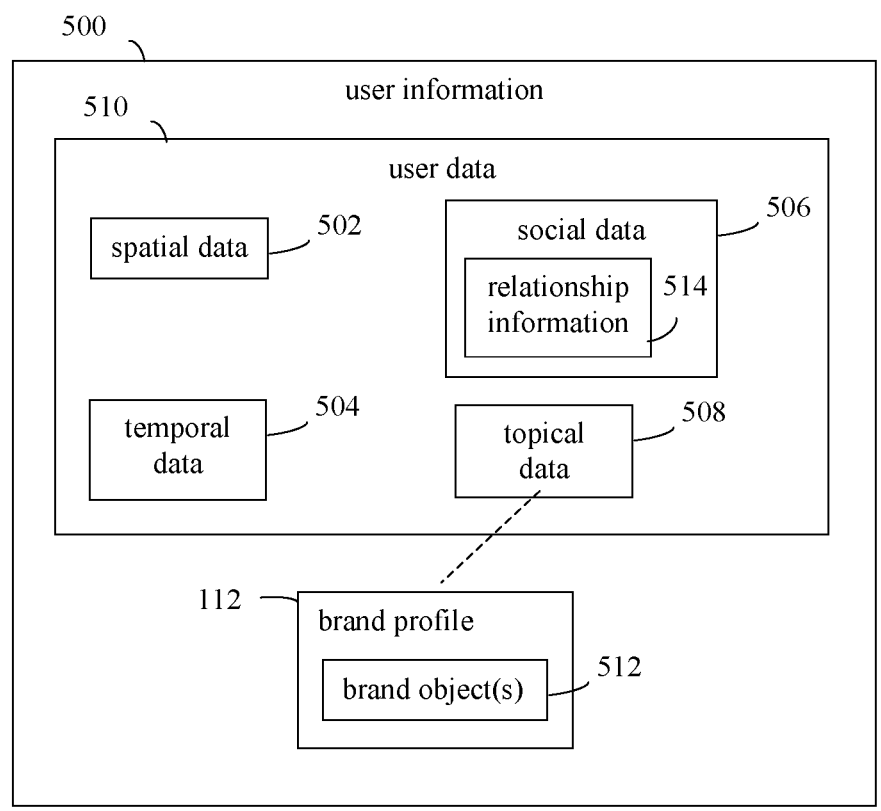
FIG. 5 shows a block diagram of example user information, according to an embodiment of the present invention.

As described above, user information 110 for each user 108 may include various types and amounts of information. The user information included in user information 110 for each user 108 may be actively provided by a user, collected from user devices 402 through social network 102 and/or another channel, provided from some other network, system or database that aggregates such data, or by any combination of the foregoing. For example, FIG. 5 shows a block diagram of user information 500, which is an example of user information 110, according to an embodiment of the present invention. User information 500 shown in FIG. 5 may be included in a file or other data structure. Each element of user information 500 shown in FIG. 5 may be one or more data fields, data records, or other type of data entry in a data structure.

As shown in FIG. 5, user information 500 includes user data 510 and brand profile 112. User data 510 includes spatial data 502, temporal data 504, social data 506 and topical data 508. As indicated in FIG. 5 (by a dotted line), brand profile 112 may be considered a form of topical data 508. Each of the elements of user data 510 shown in FIG. 5 is not necessarily present in all embodiments. The elements of user data 510 shown in FIG. 5 are described as follows.

Spatial data 502 may be any information associated with a location of a user and/or an electronic device associated with the user. For example, spatial data 502 may include any passively-collected location data, such as cell tower data, GPRS data, global positioning service (GPS) data, WI-FI data, personal area network data, IP address data and data from other network access points, or actively-collected location data, such as location data entered into a device by a user. Spatial data 502 may be obtained by tracking the path and state of an electronic device (e.g., a user device 402) associated with the user.

Temporal data 504 is time-based data (e.g., time stamps) or metadata (e.g., expiration dates) that relates to specific times and/or events associated with a user and/or an electronic device associated with the user. For example, temporal data 504 may include passively-collected time data (e.g., time data from a clock resident on an electronic device, or time data from a network clock), or actively-collected time data, such as time data entered by the user of the electronic device (e.g., a user-maintained calendar).

Social data 506 may be any data or metadata relating to the relationships of a user of an electronic device. For example, social data 506 may include user identity data, such as gender, age, race, name, an alias, a status of the user (e.g., an online status or a non-online related status) (e.g., at work, at sleep, on vacation, etc.), a social security number, image information (such as a filename for a picture, avatar, or other image representative of the user), and/or other information associated with the user's identity. User identity information may also include e-mail addresses, login names and passwords. Social data 506 may also include social network data. Social network data may include data relating to any relation of the user of the electronic device that is input by a user, such as data relating to a user's friends, family, co-workers, business relations, and the like. Social network data may include, for example, data corresponding with a user-maintained electronic address book. Certain social data may be correlated with, for example, location information to deduce social network data, such as primary relationships (e.g., user-spouse, user-children and user-parent relationships) or other relationships (e.g., user-friends, user-co-worker, user-business associate relationships) and may be weighted by primacy.

For example, as shown in FIG. 5, social data 506 may include relationship information 514. Relationship information 514 includes a list or other data structure indicating friends of the user, including friends that are other users 108 participating in social network 102. Relationship information 514 may include categories for the indicated friends, such as "relatives," "spouse," "parents," "children," "cousins," "best friends," "boss," "co-workers," and/or any other suitable category.

Social data 506 may further include reputation information regarding the user within the confines of social network 102. For example, other users 108 in social network 102 may be able to comment on and/or provide a rating for the user. An overall rating may be determined for the user, which may represent a reputation for the user in social network 102.

Topical data 508 may be any data or metadata concerning subject matter in which a user of an electronic device appears to have an interest or is otherwise associated. Topical data 508 may be actively provided by a user or may be derived from other sources. For example, topical data 508 may include one or more transaction log(s) 504 of transactions involving the user. For example, transaction log(s) 504 may include logs of searches (e.g., query lists/results lists) performed by the user, logs of commerce undertaken by the user, logs of website/webpage browsing by the user, logs of communications (e.g., with friends in social network 102) by the user, etc. As mentioned above, topical data 508 may include the user's brand profile 112/brand objects 204.

Both social data 506 and topical data 508 may be derived from interaction data. As used herein, the term interaction data refers to any data associated with interactions carried out by a user via an electronic device, whether active or passive. Examples of interaction data include interpersonal communication data, media data, transaction data and device interaction data.

Interpersonal communication data may be any data or metadata that is received from or sent by an electronic device and that is intended as a communication to or from the user. For example, interpersonal communication data may include any data associated with an incoming or outgoing SMS message, e-mail message, voice call (e.g., a cell phone call, a voice over IP call), or other type of interpersonal communication relative to an electronic device, such as information regarding who is sending and receiving the interpersonal communication(s). As described below, interpersonal communication data may be correlated with, for example, temporal data to deduce information regarding frequency of communications, including concentrated communication patterns, which may indicate user activity information.

Media data may be any data or metadata relating to presentable media, such as audio data, visual data and audiovisual data. Audio data may be, for example, data relating to downloaded music, such as genre, artist, album and the like, and may include data regarding ringtones, ring backs, media purchased, playlists, and media shared, to name a few. Visual data may be data relating to images and/or text received by an electronic device (e.g., via the Internet or other network). Visual data may include data relating to images and/or text sent from and/or captured at an electronic device. Audiovisual data may include data or metadata associated with any videos captured at, downloaded to, or otherwise associated with an electronic device.

Media data may also include media presented to a user via a network, such as via the Internet, data relating to text entered and/or received by a user using the network (e.g., search terms), and data relating to interaction with the network media, such as click data (e.g., advertisement banner clicks, bookmarks, click patterns and the like). Thus, media data may include data relating to a user's RSS feeds, subscriptions, group memberships, game services, alerts, and the like. Media data may also include non-network activity, such as image capture and/or video capture using an electronic device, such as a mobile phone. Image data may include metadata added by a user, or other data associated with an image, such as, with respect to photos, location at which the photos were taken, direction of the shot, content of the shot, and time of day, to name a few. As described in further detail below, media data may be used for example, to deduce activities information or preferences information, such as cultural and/or buying preferences information.

Interaction data may also include transactional data or metadata. Transactional data may be any data associated with commercial transactions undertaken by a user via an electronic device, such as vendor information, financial institution information (e.g., bank information), financial account information (e.g., credit card information), merchandise information and cost/prices information, and purchase frequency information, to name a few. Transactional data may be utilized, for example, to deduce activities and preferences information. Transactional information may also be used to deduce types of devices and/or services owned by a user and/or in which a user may have an interest.

Interaction data may also include device interaction data and metadata. Device interaction data may be any data relating to a user's interaction with an electronic device not included in any of the above categories, such as data relating to habitual patterns associated with use of an electronic device. Example of device interaction data include data regarding which applications are used on an electronic system/device and how often and when those applications are used. As described in further detail below, device interaction data may be correlated with temporal data to deduce information regarding user activities and patterns associated therewith.

User data 510 may also include deduced information. The deduced information may be deduced based on one or more of spatial data 502, temporal data 504, social data 506, or topical data 508 as described above. The deduced information may thus include information relating to deduced locations and/or deduced activities of the user. For example, the deduced information may comprise one or more of a primary user location, secondary user location, past locations, present location, and predicted future location information. The deduced information may include information deduced based on a correlation of spatial data 502 in conjunction with temporal data 504 to deduce such location data. By way of illustration, spatial data 502 may be correlated with temporal data 504 to determine that a user of an electronic device is often at one or more specific locations during certain hours of the day. In a particular embodiment, spatial data 502 is correlated with temporal data 504 to determine a primary user location (e.g., home), a secondary location (e.g., school or work) and/or other locations, as well as a cyclical model for a user's spatial/temporal patterns.

The deduced information may also include activity information, such as past activity information, present activity information, and predicted future activity information. In this regard, the past, present, or predicted future activity information may include information relating to past communications and/or co-locations with other users. By way of example, spatial data 502 may be correlated with temporal data 504 to determine a user's activities (e.g., work, recreation and/or home activities).

The deduced information may also include preferences information. The preferences information may include cultural preferences and/or buying preferences information. The cultural preferences information may be any preferences information relating to the culture of the user, such as gender preferences, ethnicity preferences, religious preferences and/or artistic preferences, to name a few. The buying preferences may be any preferences associated with the buying habits of the user. All preferences may be explicitly provided by a user or implicitly derived from aggregated user and network data.

Figure 6:
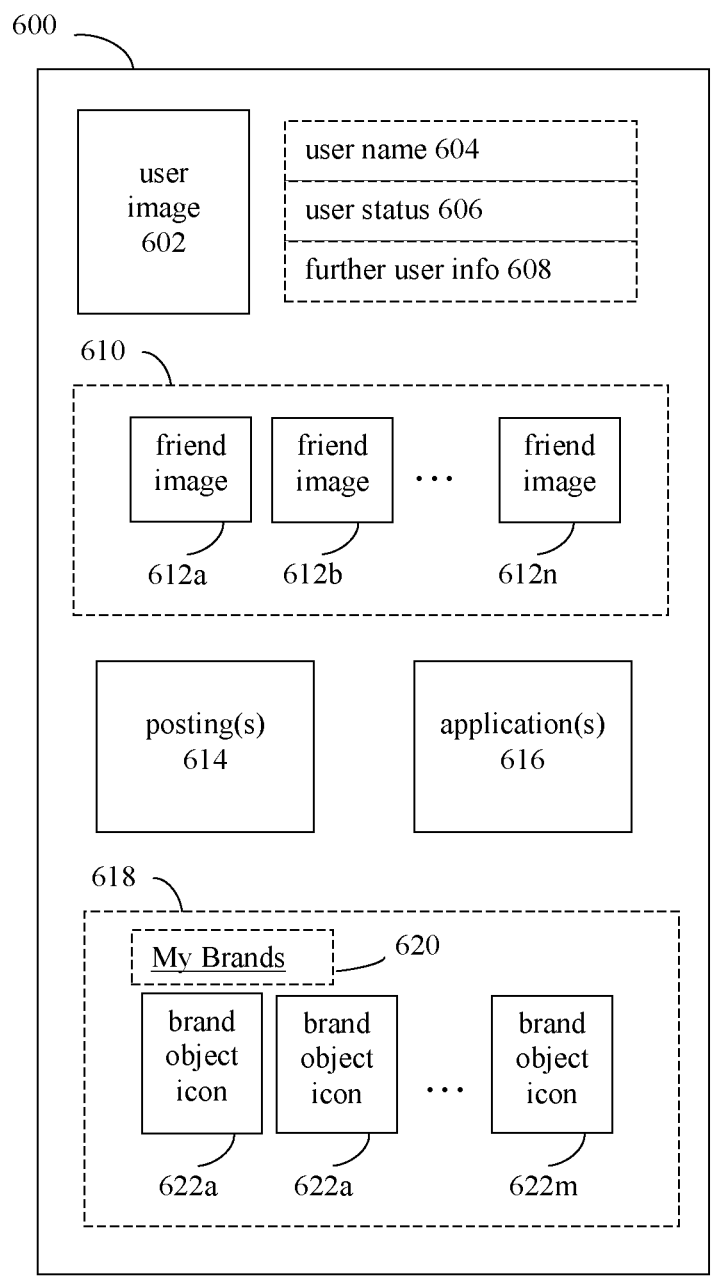
FIG. 6 shows a block diagram of an example user profile page, according to an embodiment of the present invention.

User information 110 may be configured to support a user profile page for each user 108, which may be displayed as a web page or in other form. For example, FIG. 6 shows an example user profile page 600 that may be displayed for a user 108 in social network 102, according to an embodiment of the present invention. User profile page 600 may be a web page or other suitable type of page that is generated based on user information 110 of the user 108. As shown in FIG. 6, user profile page 600 includes a user image 602, a user name 604, a user status 606, further user information 608, a friends section 610, posting(s) 614, applications(s) 616, and a brands section 618. Note that the locations and sizes of the elements of user profile page 600 shown in FIG. 6 are provided for purposes of illustration. The elements of user profile page 600 may have sizes and/or locations in page 600 other than those shown in FIG. 6. Note that the user may interact with their user profile page 600 to modify the contents of user information 500 (e.g., by adding friends to friend section 610, changing user status 606, etc.). User profile page 600 is described as follows.

User image 602 is an image of the user on which page 600 is based. The image may be a picture, avatar, or other image representative of the user, based on the filename or other image information provided in social data 506 of user information 500 (shown in FIG. 5).

User name 604 is a name, nickname, or alias for the user on which page 600 is based, as provided in social data 506.

User status 606 is a status (online and/or offline) for the user on which page 600 is based, as provided in social data 506.

Further user information 608 is any further information for the user that may be displayed on page 600, as provided in user information 500. For example, further user information 608 may include further user vitality information, reputation information (based on social data 506), location information (based on user spatial data 502), etc.

Friend section 610 provides friend images 612 (e.g., photographic images, icons, videos, etc.) for the friends included in relationship information 514 by the user. In the example of FIG. 6, friend images 612a-612n are shown. Note that friend section 610 may display images 612 for all friends included in relationship information 514 by the user, or may display images 612 for a portion of the friends (e.g., to conserve space if the number of friends of the user included in relationship information 514 is relatively large).

Posting(s) 614 may include text, images, videos, audio, etc., that may be posted by the user and/or by friends of the user. Information of posting(s) 614 may be tracked in transaction logs of topical data 508, for example.

Application(s) 616 includes applications selected by the user to be active in user profile page 600. For example, application(s) 616 may include games, surveys, quizzes, social tools, information sources, etc.

Brands section 618 displays information of brand profile 112. For example, as shown in FIG. 6, brand section 618 includes a user brand page link 620 and a plurality of brand object icons 622a-622m. Brand object icons 622 are image icons representative of the brand object(s) 512 shown in FIG. 5 for the user. The source image files for brand object icons 622 may be packaged with their respective brand object. Note that brand section 618 may display brand object icons 622 for all brand objects associated with the user, or may display brand object icons 622 for a portion of the brand objects (e.g., to conserve space if the number of brand objects associated with the user is relatively large).

By displaying brand object icons 622 in user profile page 600, a user may view the brand objects that the user has associated with his/her social network identity. By viewing a user profile page 600 of a second user, a first user may view the brand objects that the second user has associated with his/her social network identity. Based on viewing the brand objects of the second user, the first user may decide to add one or more of them to the brand objects of the first user.

User brand page link 620 is optionally present. In the example of FIG. 6, the text of user brand page link 620 is "My Brands," but may have other text in other embodiments. User brand page link 620 is a link to a brand page of the user. The linked brand page is primarily focused on the brand objects of the user. By selecting user brand page link 620, the user may navigate to the user's brand page.

Figure 7:
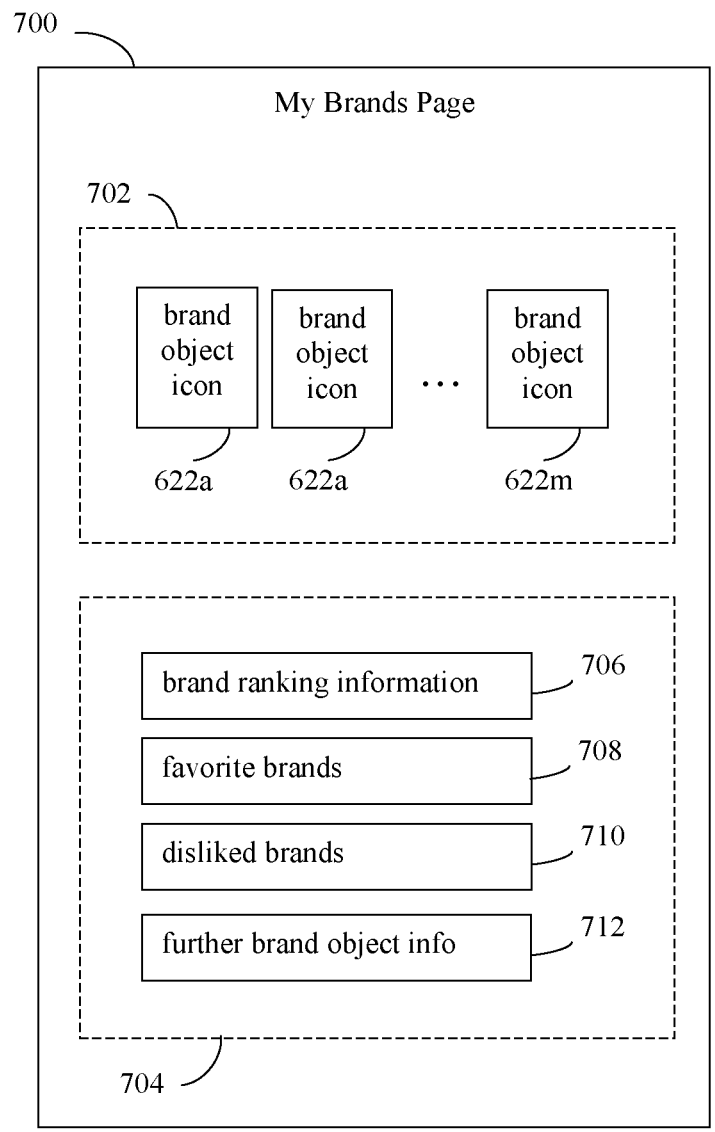
FIG. 7 shows a block diagram of a brand page for a user, according to an example embodiment of the present invention.

For instance, FIG. 7 shows an example user brand page 700, according to an embodiment of the present invention. As shown in FIG. 7, user brand page 700 includes brand object section 702 and user brand information section 704. These elements of user brand page 700 may have sizes and/or locations in page 700 other than those shown in FIG. 7.

Brand object section 702 is similar to brand section 618 of user profile page 600, displaying brand object icons 622a-622m, which are image icons representative of the brand objects contained in brand profile 112 for the user. Similarly to brand section 618, brand object section 702 may display brand object icons 622 for all brand objects associated with the user, or may display brand object icons 622 for a portion of the brand objects (e.g., to conserve space if the number of brand objects associated with the user is relatively large).

User brand information section 704 includes information about the brand objects having icons 622 displayed in brand object section 702. For example, as shown in FIG. 7, user brand information section 702 may include brand ranking information 706, favorite brands 708, disliked brands 710, and optional further brand object information 712. These elements of section 702 are described as follows.

Brand ranking information 706 may include one or more rankings generated by the user for the brand objects shown in brand object section 702. For example, brand ranking information 706 may include a "star" rating system (e.g., 0-5 stars) or any other ranking system. Note that icons 622 may be ordered in brand object section 702 according to such a ranking. In such an embodiment, brand ranking information 706 may not necessarily be shown on page 700.

Favorite brands 708 may display names, icons 622, or other representations for one or more favorite brand objects of the user, as selected by the user (e.g., by selecting them from the icons 622 displayed in brand object section 702).

Disliked brands 710 may display names, icons 622, or other representations for one or more disliked brand objects of the user, as selected by the user (e.g., by selecting them from the icons 622 displayed in brand object section 702, if any disliked brand objects represented there).

Further brand object information 712 may include any text, images, video, audio, and/or other representation of any further information the user desires to display regarding the brand objects having icons 622 displayed in brand object section 702. For example, the user may provide brand page-related commentary, other users may be enabled to provide comments regarding brand page 700, and/or other information may be provided for display in further brand object information 712.

As described above, brand objects may be interactive. For example, in an embodiment, a user may click on a brand icon 622 (e.g., in a user profile page 600 or a user brand page 700) to cause action related to the brand of the brand object, such as the opening of a web page of the represented brand. The brand page may provide further information about the brand to the user, including interactive and/or non-interactive brand-related content. The next section describes example brand pages.

E. Brand Pages

Figure 8:
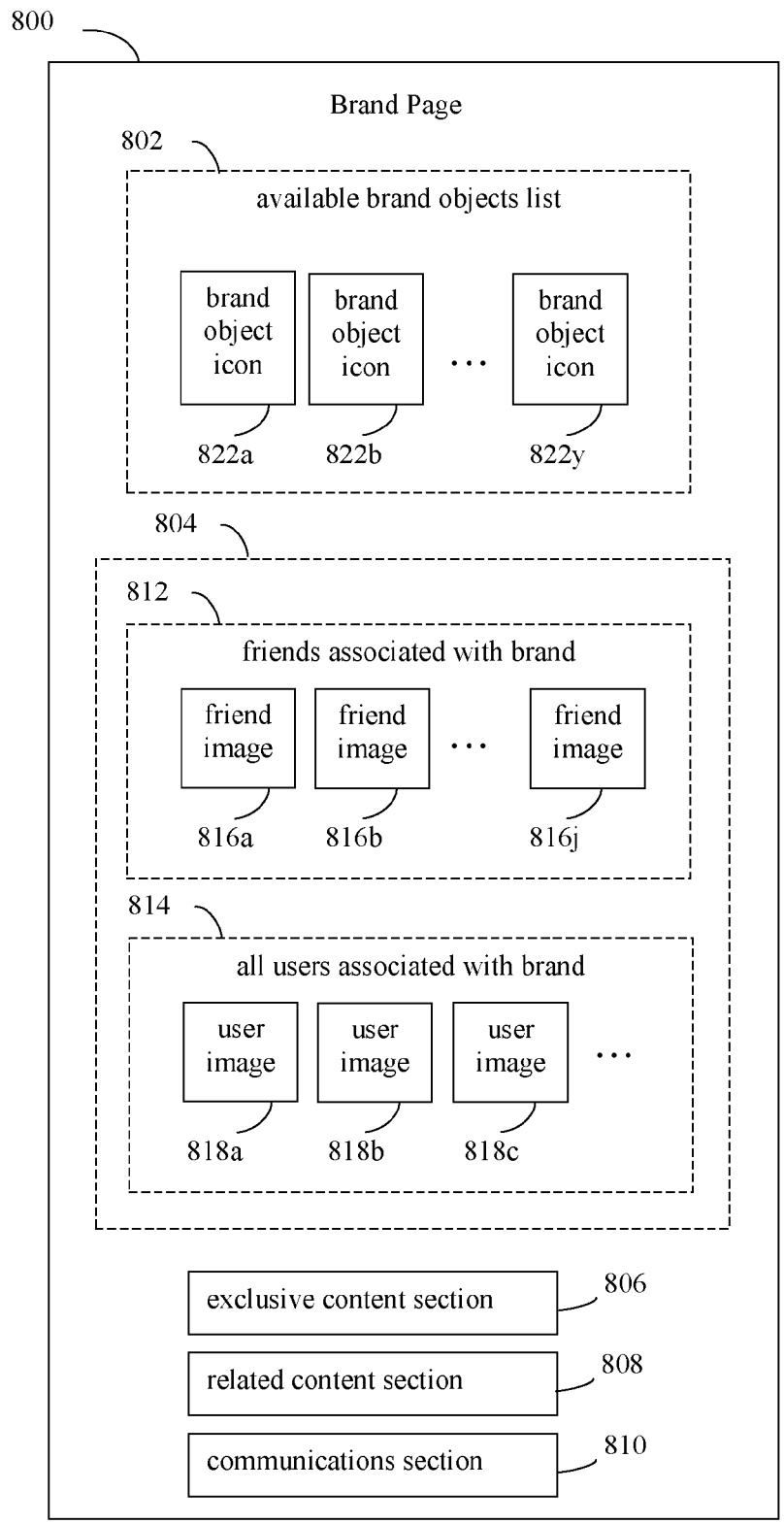
FIG. 8 shows a block diagram of an example brand page, according to an embodiment of the present invention.

Brand pages may provide information regarding brands. Brand pages may be provided by the brand entity, an advertiser, or other entity. FIG. 8 shows a block diagram of an example brand page 800, according to an embodiment of the present invention. As shown in FIG. 8, brand page 800 includes an available brand objects section 802, a brand associations section 804, an exclusive content section 806, a related content section 808, and a communications section 810. The elements of brand page 800 may have sizes and/or locations in page 800 other than those shown in FIG. 8. The elements of brand page 800 are described as follows. A user may view brand page 800 by clicking a brand icon 622 (e.g., in the user's own or other user's profile page) associated with the brand represented by brand page 800.

Available brand objects section 802 contains a display of brand objects that are available for the brand represented by brand page 800 in the form of brand icons 822. For example, if brand page 800 is a brand page for brand 202*a* shown in FIG. 2, brand page 800 may display some or all of brand objects 204*aa*-204*ay* as brand object icons 822*a*-822*y*. In an embodiment, users may select brand objects to be included in their brand profile 112 by selecting the appropriate brand icons 822 in brand page 800.

Brand associations section 804 provides an indication of users that are associated with the represented brand. For example, a user may be associated with a brand if the user includes one or more brand objects of the brand in the user's brand profile 112. For example, as shown in FIG. 8, brand associations section 804 may include an associated friends section 812 and an associated users section 814. Associated friends section 812 shows one or more friends of the user viewing brand page 800 in the form of friend images 812 (which are similar to friend images 612 shown in FIG. 6). Friend images 816*a*-816*j* are shown in FIG. 8 for illustrative purposes. Any number of friend images 816 may be present, depending on the number of friends associated with the represented brand.

Likewise, associated users section 814 shows one or more users of social network 102 associated with the brand of brand page 800 in the form of user images 818. Any number of user images 818 may be present, depending on the number of users associated with the represented brand. User images 818*a*-818*c* are shown in FIG. 8, for illustrative purposes.

Exclusive content section 806 shows content exclusive to the brand represented by brand page 800, to be viewed by users. For example, exclusive content section 806 may display community-related news, brand-related news, games (which may be interactive), contests, brand services, and any other suitable exclusive content.

Related content section 808 may show content related to the brand represented by brand page 800, to be viewed by users. For example, related content section 808 may display sponsored advertisements or interstitial advertisements, may provide links to useful websites (e.g., to search engines, etc.), and/or may provide any other suitable related content.

Communications section 810 may show contacts and/or contact information for users and/or the brand represented by brand page 800. For example, communications section 810 may display contact information (e.g., a link, an email address, a phone number, etc.) for users that have signed up or have been determined to be advocates for the brand, for actual brand representatives, for sales representatives for the brand, for customer support, etc.

F. Social and Brand Interactions in a Network

Interactions between brands and users in social network 102 of FIG. 1 are leveraged to provide an enhanced presentation of brands and content to users. This section describes several types of interactions that are enabled in embodiments of social network 102. These interactions include user-to-user interactions, interactions between a user and a brand, and interactions between first and second users and a brand.

In a traditional social network, a user interacts with other users in one-way and two-way relationships. For example, in a one-way relationship, a first user may interact with a second user, such as by sending an email to the second user. In the one-way relationship, the second user does not interact with the first user. For instance, the second user may not respond to an email received from the first user. In a two-way relationship, the first user may interact with a second user, and the second user interacts with the first user in response. For instance, the first user may provide a profile page that is viewed by the second user, and the second user may provide a profile page that is viewed by the first user. Such one-way and two-way interactions are common in social networks, and may be performed in social network 102.

Two types of possible interactions between users and brands in social network 102 are described with respect to FIGS. 9 and 10. FIG. 9 illustrates a block diagram of a first interaction type 900 that may occur between a person 902 and a brand 904. First interaction type 900 shown in FIG. 9 is a one-way interaction. Interaction type 900 may also be referred to as an "attention interaction" or an "attention graph." In FIG. 9, an arrow 906 points from brand 904 toward person 902 to indicate that brand 904 interacts with person 902. For instance, brand 904 may take action towards person 902 by displaying an advertisement that is viewed by person 902. Because first interaction type 900 shown in FIG. 9 is a one-way interaction, person 902 does not interact back with brand 904.

FIG. 10 illustrates a block diagram of a second interaction type 1000 that may occur between person 902 and brand 904. Second interaction type 1000 shown in FIG. 10 is a two-way interaction. Interaction type 1000 may be referred to as a "social interaction" or a "social graph." In FIG. 10, first arrow 906 points from brand 904 toward person 902 to indicate that brand 904 interacts with person 902. Furthermore, a second arrow 1002 points from person 902 toward brand 904 to indicate that person 902 interacts with brand 904. Second arrow 1002 may indicate that person 902 has taken action towards brand 904. For example, person 902 may have requested information related to brand 904, may have interacted with a product or service of brand 904, and/or may have purchased a product or service related to brand 904.

First and second interaction types 200 and 1000 shown in FIGS. 9 and 10, respectively, are common interactions between persons 902 and brands 904. For example, it is a common practice in the commercial world for brands to be marketed to persons. Furthermore, it is common for persons to respond to the marketing by interacting with the brands reaching out to them.

FIGS. 11 and 12 show additional types of interactions between persons and brands enabled by embodiments of the present invention. FIG. 11 illustrates a block diagram of a third interaction type 1100, which is a three way interaction that may occur between first person 902, a second person 1102, and brand 904. In FIG. 11, the two-way interaction ("social graph") shown in FIG. 10 between first person 902 and brand 904 is present. First arrow 906 points from brand 904 toward person 902 to indicate that brand 904 interacts with person 902. Second arrow 1002 points from person 902 toward brand 904 to indicate that person 902 interacts with brand 904. Furthermore, a third arrow 1104 points from first person 902 to third person 1102. Third arrow 1104 indicates that first person 902 has taken action towards second person 1102 with regard to brand 904. For example, first person 902 may bring brand 904 to the attention of second person 1102, may provide information of interest with regard to brand 904 to second person 1102, and/or take any further action with regard to brand 904 to second person 1102. First person 902 may interact with second person 1102 in any manner, including by sending an email, chatting, blogging, enabling second person 1102 to view a user profile page of first person 902 that displays an indication of brand 904, etc. In this manner, first person 902 may act as an advocate (e.g., in a marketing context) to second person 1102 with regard to brand 904 (e.g., by relaying positive information regarding brand 904 to second person 1102).

FIG. 12 illustrates a block diagram of a fourth interaction type 1200, which is a three way interaction that may occur between first person 902, second person 1102, and brand 904. In the example of FIG. 12, the two-way interaction ("social graph") shown in FIG. 10 between first person 902 and brand 904 is present. First arrow 906 points from brand 904 toward person 902 to indicate that brand 904 interacts with person 902. Second arrow 1002 points from person 902 toward brand 904 to indicate that person 902 interacts with brand 904. Furthermore, a fourth arrow 1202 points from brand 904 to second person 1102. Fourth arrow 1202 indicates that brand 904 has taken action towards second person 1102 with regard to first person 902. For example, brand 904 may bring first person 902 to the attention of second person 1102, may provide information of interest with regard to first person 902 to second person 1102, and/or take any further action with regard to first person 902 to second person 1102. Brand 904 may act as an advocate (e.g., in a social context) to second person 1102 with regard to first person 902.

An example of this is a brand page (e.g., brand page 800) of brand 904 that displays users associated with brand 904 (e.g., in associated users section 814) including first person 902. First person 902 may be displayed as a user of brand 904 in associated users section 814, and may be seen by second person 1102 when viewing brand page 800. In this manner, brand 904 introduces first person 902 to second person 1102.

Interaction types 1100 and 1200 shown in FIGS. 11 and 12 are useful in many contexts, including in advertising and social environments. For example, interaction type 1100 shown in FIG. 11 may be useful in a social and/or advertising context. The brand objects described further above enable the three-way interaction of first interaction type 1100. For example, an advertiser may display a brand object which is seen by a first user of social network 102 (first arrow 906). The first user may interact with the brand object (second arrow 1002), and may place the brand object in the first user's brand profile for display in the user's user profile page. A second user of social network 102 may view the brand object when viewing the first user's user profile page (third arrow 1102). In this manner, the first user advocates the brand represented by the brand object to the second user, according to interaction type 1100

Social network 102 may include any number and combination of the above described interactions between persons and brands. For example, FIG. 13 shows an example social network 1300, which is an example of social network 102 shown in FIG. 1. Social network 1300 includes persons 1302a-1302i and brands 1304a-1304e, for illustrative purposes. In social network 1300, persons 1302 interact with each other in one-way interactions (e.g., as between persons 1302a and 1302b) and in two-way interactions (e.g., as between persons 1302b and 1302c). Furthermore, in social network 1300, persons 1302 and brands 1304 interact with each other in one-way interactions (e.g., as with brand 1304a and person 1302b) and in two-way interactions (e.g., as with brand 1304a and person 1302a). Still further, in social network 1300, persons 1302 and brands 1304 interact with each other in three-way interactions. For example, brand 1304e, person 1302g, and 1302i interact in a three-way interaction similar to interaction type 1100 shown in FIG. 11 (e.g., person 1302i advocates brand 1304e to person 1302g). In another example, brand 1304b, person 1302e, and 1302f interact in a three-way interaction similar to interaction type 1200 shown in FIG. 12 (e.g., brand 1304b introduces person 1304f to person 1302e; as shown in FIG. 12, person 1302e may interact directly with person 1304f subsequent to the introduction).

Each person 1302 may interact with any number of other persons 1302 in social network 102, including by being introduced to a person 1302 by another person 1302 or brand 1304, which can be used to add friends to a friends list. Furthermore, each person 1302 may interact with any number of brands 1304 in social network 102, including by being introduced to a brand 1304 by another person 1302, to add brands to a person's list of brands (brand profile). Furthermore, this linking of brands and users (as indicated in friends lists and brand profiles of users) may be used by brand engine 104 to provide enhanced presentations of brands and content to users. Example embodiments for such enhanced presentation of brands and content are described in the next sections.

III. Example Embodiments for Modifying Brand Profiles

Example embodiments are described in this section for enhanced presentations of brands. Embodiments are described for modifying the display of brand profiles based on context. The example embodiments described herein are provided for illustrative purposes, and are not limiting. Further structural and operational embodiments, including modifications/alterations, will become apparent to persons skilled in the relevant art(s) from the teachings herein.

FIG. 14 shows a flowchart 1400 for displaying brand information, according to an example embodiment of the present invention. Flowchart 1400 may be performed by publication manager 306 of brand engine 300 shown in FIG. 3, for example. For illustrative purposes, flowchart 1400 is described with respect to a publication manager 1500 shown in FIG. 15, which is an example of publication manager 306, according to an embodiment of the present invention. As shown in FIG. 15, publication manager 1500 includes a mapping module 1502 and a brand profile modifier module 1504. Further structural and operational embodiments will be apparent to persons skilled in the relevant art(s) based on the discussion regarding flowchart 1400. Flowchart 1400 is described as follows.

Flowchart 1400 begins with step 1402. In step 1402, a request is received from a first user to display user information of a second user, the first user having associated user information that includes a first brand profile, and the user information of the second user including a second brand profile. For example, as shown in FIG. 15, mapping module 1502 may receive a brand profile publication request 1508 (similar to brand profile publication request 314 described above with respect to FIG. 3). Brand profile publication request 1508 may be received from a user in social network 102 shown in FIG. 1, such as first user 108a, for example. Request 1508 indicates a request by first user 108a to display user information of a second user, such as user information of second user 108b, for example. Request 1508 may be generated by first user 108a in any manner, including by clicking on a friend image 612 (FIG. 6) of second user 108b, by clicking on a link to brand information of second user 108b, or by interacting with any other image, text, or other object in social network 102 that may result in user information of second user 108b being displayed.

For example, in request 1508, first user 108a may be requesting to view a complete profile page (e.g., user profile page 600) of second user 108b, which may result in the display of all or a relatively large amount of user information 110b. Alternatively, first user 108a may be requesting to view any subset of the information contained in user information 110b of second user 108b in request 1508. For example, in request 1508, first user 108*a* may be specifically requesting to view the contents of brand profile 112*b* of second user 108*b*.

In step 1404, the user information of the first user is mapped to at least the user information of the second user. For example, as shown in FIG. 15, mapping module 1502 receives user information 110*a* and user information 110*b*, and generates a map 1512 in response to receiving request 1508. Mapping module 1502 may generate map 1512 to overlay user information 110*a* and user information 110*b*. Map 1512 may indicate one or more overlaps in the information 110*a* and 110*b* to determine one or more relationships between first and second users 108*a* and 108*b*.

In another embodiment, map 1512 is generated to include a mapping between user information 110*a* of first user 108*a* and user information 110 of a plurality of further users 108 (including user 108*b*). Map 1512 may indicate one or more overlaps in user information 110*a*, 110*b*, and user information 110 of the further users 108, which may be used to determine one or more relationships between first user 108*a*, second users 108*a*, and the further users 108. For instance, as shown in FIG. 15, in response to receiving request 1508, mapping module 1502 may map user information 110*a* of first user 108*a* to user information 110*b*-110*x* of a plurality of users 108*b*-108*x* in social network 102.

When user information of a plurality of users 108 is mapped with the user information of first user 108*a*, the particular plurality of users to have their user information mapped may be determined in any manner. For example, users 108 listed in relationship information 514 (FIG. 5) (e.g., friends) for first user 108*a* and/or second user 108*b* may be included in the mapping. Users 108 listed directly in relationship information 514 for first user 108*a* and/or second user 108*b* may be considered a first tier of relationships in a relationship hierarchy. Mapping module 1502 may include further users from further tiers of users in the relationship hierarchy. For instance, mapping module 1502 may include users from a second tier of users in the relationship hierarchy, which are the users listed in relationship information 514 of the users of the first tier. Mapping module 1502 may additionally include users from a third tier, and even further tiers in the relationship hierarchy by continuing to traverse the social connections indicated in relationship information 514 for the users in each subsequent tier.

Thus, in embodiments, mapping module 1502 may generate a map 1512 based on a mapping of user information of first user 108*a* and any number of additional users 108 in social network 102, including tens, hundreds, thousands, and even greater numbers users 108. Such embodiments leverage a large number and many types of interactions occurring between users in social network 102, including interactions types 900, 1000, 1100, and 1200 described above (with respect FIGS. 9-12), to generate increasingly more useful information in map 1512.

In embodiments, mapping module 1502 may map a portion or all of the information in user information 110*a* of first user 108*a* with corresponding information in user information 110*b* of second user 108*b* (and optionally with user information 110 of one or more further users 108). For example, map 1512 may include a mapping of brand profiles 112. Brand profile 112*a* of first user 108*a* may be mapped to brand profile 112*b* of second user 108*b*. The mapping may further include a mapping to brand profiles 112 of further users 108. Overlaps in map 1512 may indicate one or more brand objects 204 that co-occur in brand profiles 112*a* and 112*b* (and optionally in further brand profiles 112). Map 1512 may also indicate brand objects 204 that occur in brand profile 112*a* but do not occur in brand profile 112*b* (and/or in further brand profiles), and that do not occur in brand profile 112*a* but do occur in brand profile 112*b* (and/or in further brand profiles 112).

The mapping just described may be considered a "social" and "topical" mapping between users. For instance, users 108 may each have related users 108 in social network 102, which may be referred to as "friends." Users 108 that are friends of a user 108 may be indicated in an associated data structure of the user 108, such as relationship information 514 shown in FIG. 5. These related users 108 may be considered as social social data 506 for a user 108. Furthermore, brand objects 204 contained in brand profiles 112, and which relate to brands, may be considered as topical data 508 for a user 108. Because mapping module 1502 maps user information 110 between users 108, including mapping brand profiles 112 of the users 108, this mapping of brand may be considered a "social" and "topical" mapping between users.

In further embodiments, additional user data of user information 110 may be mapped by mapping module 1502 between users 108, including spatial data 502 and/or temporal data 504 (shown in FIG. 5 for user data 510) of the users 108. For instance, location information related to a user 108 may be stored as spatial data 502 for the user 108. This location information may be mapped for user 108*a*, user 108*b*, and optionally for further users 108 in map 1512. Furthermore, time information related to a user 108 may be stored as temporal data 504 for the user 108. This time information may be mapped for user 108*a*, user 108*b*, and optionally for further users 108 in map 1512. Examples of spatial data 502 and temporal data 504 that may be included in user information 110 for users, and thus that may be mapped by mapping module 1502, are described as follows.

Spatial data 502 may include one or more locations at which a user 108 interacted with information and/or real world entities related to brand objects 204. For example, first user 108*a* may have walked by, driven past, or even stopped/paused in front of a BMW™ dealership at an intersection of Main and Maple Streets in Springfield, Mo. This spatial information may be stored in user data 510*a* of first user 108*a*. For instance, the location "intersection of Main and Maple Streets in Springfield, Mo." may be stored as spatial data 502 of user data 510*a*. This location information may be related to a brand object 204. For example a BMW™ brand object 204 may be present in brand profile 112*b* of second user 108*b*. Thus, spatial data 502 related to BMW™ brand object 204 may be associated with second user 108*b*, because brand profile 112*b* of second user 108*b* includes the BMW™ brand object 204. A location of all BMW dealerships may be associated with the BMW™ brand object 204, and thus may be included in spatial data 502 for second user 108*b*. If map 1512 is generated to include a mapping of spatial data for users 108, map 1512 may indicate an overlap in spatial data 502 for first user 108*a* and in spatial data 502 for second user 108*b*, in the BMW™ dealership at an intersection of Main and Maple Streets in Springfield, Mo.

Temporal data 504 may include times at which users 108 interacted with information and/or real world entities related to brand objects 204. For example, both first user 108*a* and second user 108*b* may have attended the same concert or other event, as indicated by both first user 108*a* and second user 108*b* having the same location (the location of the concert) at the same time (the time of the concert) indicated in their respective spatial and temporal data 502 and 504. If map 1512 is generated to indicate a mapping of spatial and temporal data for users 108, map 1512 may indicate an overlap in spatial data 502 and temporal data 504 for first and second users 108*a* and 108*b* due to both of their attendances at the concert.

In another example, while spatial data 502 may indicate that users 108 have been to a same location, temporal data 504 may indicate the users 108 were at the same location at different times. For example, spatial data 502 of first and second users 108a and 108b may indicate they both purchase coffee at a common coffee shop. Temporal data 504 of first user 108a may indicate that first user 108a shops at the coffee shop at a first time (e.g., in the morning), while the temporal data 504 of second user 108b may indicate that second user 108a shops at the coffee shop at a second time (e.g., in the evening). Thus, if map 1512 is generated to indicate a mapping of spatial and temporal data for users 108, map 1512 may indicate an overlap in spatial data 502 (shopping at same coffee shop), while indicating a lack of overlap in temporal data 504 (shopping at different times), with regard to first and second users 108a and 108b.

Thus, in step 1404 of flowchart 1400, mapping module 1502 may generate map 1512 to map user data related to any number of users, and to include a mapping of any combination of spatial data 502, temporal data 504, social data 506, and/or topical data 508. In an embodiment, step 1404 of flowchart 1400 may be performed by mapping module 1502 according to a flowchart 1600 shown in FIG. 16. FIG. 16 shows a flowchart 1600 for mapping user data, according to an example embodiment of the present invention. Flowchart 1600 is described as follows.

In step 1602, user data is retrieved from the user information of each of the first user and one or more further users, the user data including one or more of spatial, temporal, social, or topical data associated with each user. As described above, user data 510, including spatial data 502, temporal data 504, social data 506, and/or topical data 508 may be obtained for first user 108a, second user 108b, and any additional users 108, from their respective user information 110. User data 510 (of user information 500) may be stored in and retrieved from any suitable storage location, including centralized storage located local or remote to brand engine 104 (e.g., storage 318 shown in FIG. 3), storage accessed through social network engine 406 (e.g., social network database 410), or distributed storage (e.g., storage of user devices 402).

In step 1604, the retrieved user data is graphed. For example, in an embodiment, mapping module 1502 may generate graph data for a multi-dimensional graph, having a number of dimensions dependent on spatial data 502, temporal data 504, social data 506, and/or topical data 508. For example, a four dimensional graph may be generated, with spatial data 502, temporal data 504, social data 506, and topical data 508 being the respective axes of the graph. Furthermore, each user 108 involved in the mapping may be a respective node in the graph, covering a four dimensional space determined by the user's spatial data 502, temporal data 504, social data 506, and topical data 508. Any intersections of spatial data 502, temporal data 504, social data 506, and/or topical data 508 in the graph for two or more users 108 may indicate a corresponding spatial, temporal, social, and/or topical relationship between the users. An amount of the overlap may indicate a type and strength of the relationship. A lack of overlap in the graph in any one or more of spatial data 502, temporal data 504, social data 506, and/or topical data 508 may indicate a corresponding relationship distance between the users. Such relationships and/or distance information may be used to determine modifications to brand profiles and/or to content. Description of the determination and analysis of such relationships is described as follows.

Referring back to flowchart 1400 in FIG. 14, in step 1406, a modified representation of the second brand profile is generated based on the map. For example, in an embodiment, brand profile modifier module 1504 may generate a modified representation of the second brand profile based on the map generated in step 1404. As shown in FIG. 15, brand profile modifier module 1504 receives map 1512, user information 110a, and user information 110b. Brand profile modifier module 1504 may optionally receive user information 110c-110x of further users 108c-108x. Brand profile modifier module 1504 generates response 1510 (similar to brand profile publication response signal 320 described above with respect to FIG. 3) based on map 1512 and the received user information. Response 1510 includes a modified brand profile representation for brand profile 112b of second user 108b, and may optionally include further data of user information 110b (e.g., when displaying a complete user profile page for user 108b). Brand profile modifier module 1504 is coupled to brand collection 106 by communication interface 116 to receive any brand objects 204 to be transmitted in response 1510. Response 1510 is transmitted from brand profile modifier module 1504 to the requesting user in social network 102 (e.g., first user 108a).

Brand profile modifier module 1504 may generate the modified brand profile representation to include a representation of any type and amount of modification to brand profile 112b of second user 108b. Example types of modifications include filtering of brand profile 112b (e.g., removing one or more brand objects 204), sorting of brand profile 112b (e.g., reordering of brand objects 204 in brand profile 112b), providing a recommendation for one or more brand objects 204, and modifying one or more brand objects 204 of brand profile 112b. The modified brand profile representation may include any one of, or any combination of these modification types. Examples of these types of modifications are described as follows with respect to FIGS. 17-21 in the context of a mapping of two users, for ease of illustration. In further embodiments, these types of modifications can be performed in the context of the mapping of any number of users, as would be known to persons skilled in the relevant art(s) from the teachings herein.

FIG. 17 shows an example of user information 110a and user information 110b stored in social network database 410. User information 110a includes brand profile 112a, and user information 110b includes brand profile 112b. As shown in FIG. 17, brand profile 112a includes brand objects 204a-204e, and brand profile 112b includes brand objects 204a, 204c, 204d, and 204f-204h. First user 108a may have previously added brand objects 204a-204e to brand profile 112a as representations of brands in which first user 108a is interested, and second user 108b may have previously added brand objects 204a, 204c, 204d, and 204f-204h to brand profile 112b as representations of brands in which second user 108b is interested. Typically, if first user 108a displays brand profile 112a (e.g., using one of user devices 402 shown in FIG. 4), brand objects 204a-204e are displayed, and if first user 108a displays brand profile 112b of second user 108b, brand objects 204a, 204c, 204d, and 204f-204h are displayed.

In an embodiment of the present invention, if first user 108a attempts to display brand profile 112b of second user 108b (e.g., by attempting to view the user profile page of second user 108b), request 1508 is generated at the user device of first user 108a. Request 1508 is transmitted from the user device. Request 1508 is received by mapping module 1502, which maps user information 110a to user information 110b as described above with respect to step 1404, and generates map 1512. Map 1512 may be used to determine relationships between users 108a and 108b, which may be used to generate a modified representation of brand profile 112b of second user 108b. Map 1512 is received by brand profile modifier module 1504.

In an embodiment, brand profile modifier module 1504 may be configured to filter brand profiles in step 1406 of flowchart 1400 based on map 1512. Brand profile modifier module 1504 receives map 1512, which includes the mapping of user information 110a to user information 110b, and generates a filtered representation of brand profile 112b based on map 1512. In the filtered representation of brand profile 112b, one or more of brand objects 204a, 204c, 204d, and 204f-204h are not present. For instance, brand profile modifier module 1504 may be configured to filter out brand objects 204 that are not present in both of brand profiles 112a and 112b shown in FIG. 17 (filter out topical data 508 that does not overlap). Brand profile modifier module 1504 may generate response 1510 to include common brand objects—brand objects 204a, 204c, and 204d.

For example, FIG. 18 shows a display 1802 of a user device of first user 108a, according to an embodiment of the present invention. In the example of FIG. 18, first user 108a interacts with a browser 1804 to display a brand profile of second user 108b. In the current example, brand profile modifier module 1504 generated response 1510 to include common brand objects 204a, 204c, and 204d. The user device of first user 108a receives response 1510, and as a result, display 1802 displays a modified brand profile 1806 that includes common brand objects 204a, 204c, and 204d (brand objects 204f-204h of brand profile 112b are filtered out), by showing brand object icons 622a, 622c, and 622d that represent common brand objects 204a, 204c, and 204d.

In another filtering example, brand profile modifier module 1504 may be configured to filter out brand objects 204 from brand profile 112b that are present in brand profile 112a (filter out overlapping topical data 508). For instance, in the current example, brand profile modifier module 1504 may generate response 1510 to include brand objects 204f-204h, which are present in brand profile 112b of second user 108b, but are not present in brand profile 112a of first user 108a. As a result, the display of the user device of first user 108a may display a modified brand profile that includes brand objects 204f-204h. Brand profile modifier module 1504 may be configured to perform further types of filtering of brand profiles based on map 1512.

In one filtering example, as described above, relationship information 514 of social data 506 (shown in FIG. 5) may list "friends" for first user 108a. These friends may be categorized as "relatives," "spouse," "parents," "children," "cousins," "best friends," "boss," "co-workers," and/or any other suitable category. In an embodiment, brand profile modifier module 1504 may be configured to filter brand profile 112b based on the relationship between user 108a and user 108b. For example, if second user 108a is a child of first user 108a, brand profile modifier module 1504 may be configured to filter out brand objects from brand profile 112b that second user 108a (child) may not want first user 108a (parent) to view, such as brand objects related to youth-oriented entertainment brands (e.g., rock bands, rap artists, etc.). In the opposite case, if second user 108a is a parent of first user 108a, brand profile modifier module 1504 may be configured to filter out brand objects from brand profile 112b that second user 108a (parent) may not want first user 108a (child) to view, such as brand objects related to more mature themed brands (e.g., movies having violence or other mature themes, alcoholic beverages, cigarettes, etc.). Brand profile modifier module 1504 may be configured to filter brand profile 112b based on any indicated relationship between first and second user 108a and 108b, including by age. Brand profile modifier module 1504 may also be configured to sort, recommend, or modify brand profile 112b based on a relationship between first and second user 108a and 108b.

In a similar manner, brand profile modifier module 1504 may be configured to filter (and/or sort, recommend, or modify) brand profile 112b based on time of day (e.g., filtering out particular brand objects in the morning, midday, and/or at night) and/or location of first user 108a.

In another embodiment, brand profile modifier module 1504 may be configured to sort brand objects in step 1406 of flowchart 1400 based on map 1512. Brand profile modifier module 1504 receives map 1512, which includes the mapping of user information 110a to user information 110b, and generates a sorted representation of brand profile 112b based on map 1512. In the sorted representation of brand profile 112b, brand objects 204a, 204c, 204d, and 204f-204h may be sorted into a different order. For example, one of brand objects 204a, 204c, 204d, and 204f-204h may be determined by analysis of map 1512 to be more relevant to first user 108a, and thus may be moved to be displayed first. For instance, the most relevant brand object may be brand object 204g. Brand object 204g may be determined to be most relevant because it is indicated in map 1512 as most closely relating to brand objects 204a-204e of first user 108a (has a greatest overlap of spatial, temporal, social, and/or topical data 502-508 between first and second users 108a and 108b), because the most advertising revenue is received from display of brand object 204g, and/or for any other reason. A sorted second brand object, third brand object, etc., may be selected in a similar manner for the sorted representation of brand profile 112b. In the current example, brand profile modifier module 1504 may generate response 1510 to include the following sorted list of brand objects of brand profile 112b-brand object 204g, 204c, 204f, 204a, 204h, and 204d, ranked from greatest relevant to least relevance.

FIG. 19 shows display 1802 of the user device of first user 108a displaying sorted brand objects, according to an embodiment of the present invention. In the example of FIG. 19, first user 108a interacts with browser 1804 to display a brand profile of second user 108b. In the current example, brand profile modifier module 1504 generated response 1510 to include sorted brand objects, in the order of brand objects 204g, 204c, 204f, 204a, 204h, and 204d. The user device of first user 108a receives response 1510, and as a result, display 1802 displays a modified brand profile 1906 that includes sorted brand objects 204g, 204c, 204f, 204a, 204h, and 204d by showing associated brand object icons 622g, 622c, 622f, 622a, 622h, and 622d. Sorting may be particularly useful when brand profile 112b of second user 108b is very large, including being too large to display all brand objects icons 622 at once, and thus important brand objects 204 can be sorted to the beginning of the list to be more easily visible.

In another embodiment, brand profile modifier module 1504 may be configured to add/recommend brand objects in step 1406 of flowchart 1400 based on map 1512. Brand profile modifier module 1504 receives map 1512, which includes the mapping of user information 110a to user information 110b, and generates a representation of brand profile 112b based on map 1512 that includes a recommended brand object (e.g., that is not present in either of first and second brand profiles 112a and 112b). In a generated representation of brand profile 112b, brand objects 204a, 204c, 204d, and 204f-204h may be present, as well as a recommended brand object 204i. Brand object 204i may be determined by analysis of map 1512 to be relevant to first user 108a, and thus added as recommended brand object. Brand object 204g may be recommended to first user 108*a* for one or more reasons, including being representative of a brand in a class of brands determined to be of interest to first user 108*a* by analysis of map 1512, as being representative of a brand in a class of brands determined to be of interest to both of first and second users 108*a* and 108*b* by analysis of map 1512, and/or for any other reason. Any number of recommended brand objects may be determined. In the current example, brand profile modifier module 1504 may generate response 1510 to include the brand objects 204*a*, 204*c*, 204*d*, and 204*f*-204*h* (of second profile 112*b*) and recommended brand object 204*i*.

FIG. 20 shows display 1802 of the user device of first user 108*a* displaying a recommended brand object, according to an embodiment of the present invention. In the example of FIG. 20, first user 108*a* interacts with browser 1804 to display a brand profile of second user 108*b*. In the current example, brand profile modifier module 1504 generated response 1510 to include brand objects 204*a*, 204*c*, 204*d*, and 204*f*-204*h* and recommended brand object 204*i*. The user device of first user 108*a* receives response 1510, and as a result, display 1802 displays a modified brand profile 2006 that includes brand objects 204*a*, 204*c*, 204*d*, and 204*f*-204*h* and recommended brand object 204*i*, by showing brand object icons 622*a*, 622*c*, 622*d*, and 622*f*-622*h* and showing brand object icon 622*i* in a recommended brand object section 2002 (which may be indicated in display 1802 by the text "recommended brands" and/or by other suitable text/image).

In another embodiment, brand profile modifier module 1504 may be configured to modify one or more brand objects in step 1406 of flowchart 1400 based on map 1512. Brand profile modifier module 1504 receives map 1512, which includes the mapping of user information 110*a* to user information 110*b*, and generates a representation of brand profile 112*b* based on map 1512 that includes a modified brand object. For example, in a generated representation of brand profile 112*b*, brand objects 204*a*, 204*c*, 204*d*, and 204*f*-204*h* may be present. Brand object 204*c* may be determined by analysis of map 1512 to be desired for modification for one or more reasons. For example, brand object 204*c* may be modified because it is determined to be of heightened or decreased relevance to first user 108*a* by analysis of map 1512 (e.g., due to co-occurrence with other brand objects 204), because a change occurred in the brand represented by brand object 204*c*, because brand object 204*c* is determined to be of interest to both of first and second users 108*a* and 108*b* by analysis of map 1512, and/or for any other reason. Any number of brand objects may be modified. In the current example, brand profile modifier module 1504 may generate response 1510 to include the brand objects 204*a*, 204*d*, and 204*f*-204*h* (of second profile 112*b*) and a modified version of brand object 204*c*.

FIG. 21 shows display 1802 of the user device of first user 108*a* displaying a modified brand object, according to an embodiment of the present invention. In the example of FIG. 21, first user 108*a* interacts with browser 1804 to display a brand profile of second user 108*b*. In the current example, brand profile modifier module 1504 generated response 1510 to include brand objects 204*a*, 204*d*, and 204*f*-204*h* and a modified version of brand object 204*c*. The user device of first user 108*a* receives response 1510, and as a result, display 1802 displays a modified brand profile 2106 that includes brand objects 204*a*, 204*d*, and 204*f*-204*h* and a modified version of brand object 204*c*, by showing brand object icons 622*a*, 622*d*, and 622*f*-622*h* and showing modified brand object icon 2102*c*.

A brand object may be modified in any manner. For example, modified brand object icon 2102*c* can be modified (relative to brand object icon 622*c*) to have modified text and/or graphics. Modified brand object icon 2102*c* may have different text and/or one or more different images relative to brand object icon 622*c*, may be blinking, may be/have one or more different colors, may be moving (e.g., vibrating, turning), have a changed size or be changing in size, may be emanating sound (e.g., an associated sound file may be playing), may be showing video, and/or may have any other suitable visual and/or audio difference relative to brand object 622*c*. The modification may be intended to cause attention to be drawn to modified brand object icon 2102*c*, such as by using brighter colors, motion, etc., if brand object 204*c* is determined to have heightened relevance. Alternatively, the modification may be intended to draw less attention to modified brand object icon 2102*c*, such as by using muted colors, grayscale, etc., if brand object 204*c* is determined to have decreased relevance.

Thus, brand profile modifier module 1504 may modify brand profiles in a variety of ways. Such modifications are based upon map 1512, which may include a mapping between user information of users 102*a* and 102*b* (as in the immediately preceding examples), or a mapping between user information of user 102*a* and user information of a plurality of further users (including user 102*b*). Map 1512 may include a mapping of spatial data 502, temporal data 504, social data 506, and/or topical data 508 of users, as described above.

In an embodiment, step 1406 of flowchart 1400 may be performed by brand profile modifier module 1504 according to a flowchart 2200 shown in FIG. 22. FIG. 22 shows a flowchart 2200 for generating a modified brand profile, according to an example embodiment of the present invention. Flowchart 2200 is a continuation of flowchart 1600 described above with respect to mapping module 1502. Flowchart 2200 is described as follows.

In step 2202, one or more relationships between brand profiles of the first user and the plurality of users are determined from the graph of step 1604. For example, in an embodiment, brand profile modifier module 1504 may receive the graph data generated by mapping module 1502 according to step 1604. As described above, the graph data may have a number of dimensions dependent the included types of data, such as spatial data 502, temporal data 504, social data 506, and/or topical data 508). Brand profile modifier module 1504 may be configured to determine one or more relationships between user information of users from the graph. For example, brand profile modifier module 1504 may determine relationships in spatial data 502, temporal data 504, social data 506, and/or topical data 508 between the users. User data may be plotted in the graph for each user, such that each user is a node in the graph, and the node has a multidimensional shape based on spatial data 502, temporal data 504, social data 506, and/or topical data 508 of the corresponding user. An amount of the overlap in the graph between users may indicate a type and strength of the relationship between users. A lack of overlap in the graph in any one or more of spatial data 502, temporal data 504, social data 506, and/or topical data 508 may indicate a corresponding relationship distance between users. Such relationships and/or distance information may be used to determine modifications to brand profiles.

For example, relationships between brand objects 204 contained in the brand profiles of the users may be determined from the graph. The graph may indicate one or more brand objects 204 that co-occur in brand profiles 112 of the users, brand objects 204 that occur in brand profile 112*a* of first user 108*a* but do not occur in any or many brand profiles 112 of the further users, and brand objects 204 that do not occur in brand profile 112a of first user 108a but may occur in many (or all) brand profiles 112b of the further users.

Furthermore, spatial data 502 of the graph may indicate a relationship between brand objects 204 of the users. For example, with regard to the example described above of the BMW™ brand object 204, brand profile modifier module 1504 may determine from the graph that a spatial relationship exists between first user 108a and second user 108b. First user 108a passed by the BMW™ dealership, and brand profile 112b of second user 108b has the BMW™ brand object 204, which has associated dealership location information. Therefore, an overlap in spatial data 502 between first user 108a and second user 108b exists with respect to the BMW™ brand object 204.

Likewise, temporal data 504 of the graph may indicate a relationship between brand objects 204 of the users. For example, the graph may indicate that two or more users were present at the same event, due to overlapping temporal data 504 and spatial data 504 related to the event. With regard to the concert example, temporal data 504 (and spatial data 502) of users 108a and 108b may indicate they both attended the concert (e.g., first and second users 108a and 108b were at same location at same time). Thus, a relationship in spatial data 502 and temporal data 504 between first user 108a and second user 108b exists with respect to the concert. Second user 108b may have a concert related brand object 204 in user profile 112b, such as a brand object of a band, singer, or other entertainer (e.g., The Rolling Stones, Sting, etc.). Thus, an overlap in spatial data 502 and temporal data 504 between first user 108a and second user 108b exists with respect to the concert brand object 204.

With regard to the coffee shop example, spatial data 502 may indicate that users 108 have been to the same location, while temporal data 504 may indicate the users 108 were at the location at different times. Thus, an overlap in spatial data 502 but not in temporal data 504 between first user 108a and second user 108b may exist with respect to a brand object 204 related to the coffee shop, indicating another type of relationship with the coffee shop brand object 204 (e.g., a common location to visit, but not a common event).

A graph generated by mapping module 1502 in step 1604 of flowchart 1600 may be used to determine further relationships between users and brand profiles in step 2202 of flowchart 2200. For example, the graph may indicate adoption patterns of brand objects 204 across social network. When a new brand object 204 is introduced to social network, a first user in social network will add the new brand object 204 to their brand profile 112 from brand collection 106 (shown in FIG. 1). Further users will add the new brand object 204 from brand collection 106 or from the first user's brand profile 112. Even further users will add the new brand object 204 from brand collection 106 or from brand profiles 112 of previous users to add the new brand object 204. In this manner, the new brand object 204 may spread throughout social network 104. The graph may be analyzed to determine this pattern of spread for the new brand object 204. Users in social network 102 that are more important than other users in facilitating the spread of the new brand object 204 may be determined from this adoption pattern, from relationships between temporal data 504 (times that users obtained the new brand object 204) and social data 506 (the source users from which subsequent users obtained the new brand object 204). Users in social network 102 that enabled the most users in social network 102 to receive the new brand object 204 may be considered key brand object facilitators or influencers. Such users may be key users in their respective friend networks in social network 102 for spreading information. If first user 108a is a key brand object influencer, brand profile modifier module 1504 may be configured to recommend new brand objects to first user 108a to aid in facilitating their efficient and rapid spread throughout users in social network 102.

In step 2204, one or more probability scores corresponding to the determined one or more relationships are determined. For each relationship, a probability score may be determined. Such probability scores may be determined in any suitable manner. For example, a probability score may be determined on a variety of relationship factors, including an amount of overlap of user data 510 (spatial data 502, temporal data 504, social data 506, and/or topical data 508) for one or more users 108, the number of users 108 having any particular overlap of user data 510, a distance between users 108 for user data 510 that does not overlap (e.g., a spatial distance, a temporal distance, a social distance, and/or a topical distance), etc.

For instance, as shown in FIG. 17, brand profile 112a of first user 108a includes brand objects 204a-204e, and brand profile 112b of second user 108b includes brand objects 204a, 204c, 204d, and 204f-204h. Brand profile modifier module 1504 may determine a relationship between users that include brand objects 204a-204e in their brand profiles and users that include brand object 204f in their brand profiles (a co-occurrence relationship). The determined relationship may be used to determine a probability score.

For instance, 78% of users (a relatively high correlation) mapped in map 1512 that include all of brand objects 204a-204e in their brand profiles may also include brand object 204f in their brand profiles. Thus, there may be a high probability score (e.g., 78%) that user 108a may be interested in brand object 204f. In another example, only 12% of users (a relatively low correlation) that include all of brand objects 204a-204e in their brand profiles may also include brand object 204g in their brand profiles. Thus, there may be a low probability score (e.g., 12%) that user 108a may be interested in brand object 204g.

In step 2206, the modified representation of the second brand profile is determined based on the one or more probability scores. The modified representation of second brand profile 112b (of second user 108b) may be determined as described above, to provide a filtered and/or sorted brand profile, to provide a brand object recommendation, and/or to provide a modified brand object.

For instance, in the case where 78% of users that include all of brand objects 204a-204e in their brand profiles also include brand object 204f in their brand profiles, brand profile modifier module 1504 may generate a recommendation of brand object 204f (e.g., FIG. 20) to user 108a. Furthermore, or alternatively, brand profile modifier module 1504 may generate a modified brand profile that sorts brand object 204f to be located near the top or at the top of a brand object list (e.g., FIG. 19). Furthermore, brand profile modifier module 1504 may generate a modified version of brand object 204f to attract attention to brand object 204f (e.g., FIG. 21).

In the case where only 12% of users that include all of brand objects 204a-204e in their brand profiles also include brand object 204g in their brand profiles, brand profile modifier module 1504 may generate a modified brand profile that filters out (does not display) brand object 204g. Alternatively, brand profile modifier module 1504 may generate a modified brand profile that sorts brand object 204g to be located near the bottom, or at the bottom, of the list of displayed brand objects. Furthermore, brand profile modifier module 1504 may generate a modified version of brand object 204g that is configured to attract less attention to brand object 204g (e.g., FIG. 21) (e.g., the modified brand object may have a duller color, may be turned to a grayscale or black and white image, etc.).

Mapping module 1502 and brand profile modifier module 1504 may be implemented in hardware, software, firmware, or any combination thereof. For example, mapping module 1502 and brand profile modifier module 1504 may each be implemented in code configured to execute in one or more processors.

Referring back to flowchart 1400 in FIG. 14, in step 1408, the modified representation of second brand profile is transmitted for display. As described above, response 1510 may be generated by brand profile modifier module 1514, which includes a modified version of second brand profile 112b. Response 1510 may be transmitted to the user device of first user 108a. FIGS. 18-21 show examples of display 1802 of the user device of first user 108a displaying a modified brand profile (e.g., modified brand profiles 1806, 1906, 2006, or 2106 of FIGS. 18-21) based on receiving response 1510.

IV. Example Embodiments for Presenting Modified Content

Example embodiments are described in this section for enhanced presentations of content associated with brands. For instance, embodiments are described for modifying the display of content based on context. The example embodiments described herein are provided for illustrative purposes, and are not limiting. Further structural and operational embodiments, including modifications/alterations, will become apparent to persons skilled in the relevant art(s) from the teachings herein.

Online content may be displayed in connection with the display of brand profiles. Such content may be advertisements, search results, news, or any other type of online content. For example, FIG. 23 shows a block diagram of a brand marketing and social network system 2300, according to an example embodiment of the present invention. Brand marketing and social network system 2300 is similar to system 100 shown in FIG. 1, with the addition of content engine 2302. Content engine 2302 enables content to be displayed by users 108 in social network.

For example, FIG. 24 shows a block diagram of content engine 2302, according to an example embodiment. As shown in FIG. 23, content engine 2302 includes a search engine 2402, an advertising engine 2404, and a news engine 2406. In implementations, content engine 2302 may include any one or more of search engine 2402, advertising engine 2404, news engine 2406, and/or further content sources. Furthermore, although a single content engine 2302 is shown in FIG. 23, any number of content engines 2302, including any number of search engines 2402, advertising engines 2404, and/or news engines 2406, may be accessible to social network 102.

Search engine 2302 is an information retrieval system used to locate documents and other information stored on a computer system. Search engines are useful at reducing an amount of time required to find information. One well known type of search engine is a Web search engine which searches for documents, such as web pages, on the "World Wide Web." Examples of search engine 2302 include Yahoo! Search™ (at http://www.yahoo.com), Ask.com™ (at http://www.ask.com), and Google™ (at http://www.google.com). To perform a search using search engine 2302, a user 108 enters a query in a user device. The query is transmitted to search engine 2302, and in response, search engine 2302 transmits search results to the user device for display to the user 108.

Advertising engine 2304 is a system that provides advertisements for display by user devices of users 108. For example, when a user 108 views a website displayed by a user device, a request for one or more advertisements may be transmitted to advertising engine 2304 (e.g., either directly from the user device or from the website). In response, advertising engine 2304 determines one or more advertisements, and transmits the determined advertisements to the user device for display to the user on a webpage of the website. Advertising engine 2304 may supply any type of advertisement, including banner ads, floating ads, pop-up ads, video ads, etc.

News engine 2306 is a system that provides news-related content for display by user devices of user 108. For example, when a user 108 views a new-related website displayed by a user device, a request for one or more news articles may be transmitted to news engine 2306 (e.g., either directly from the user device or from the website). In response, news engine 2306 determines the appropriate news articles, and transmits the determined news articles to the user device for display to the user on a webpage of the news-related website. News engine 2306 may supply any type of news article, including U.S. news, world news, local news, sports news, entertainment news, financial news, etc. Examples of news engine 2306 include Yahoo! (www.yahoo.com), MSNBC (www.msnbc.com), The New York Times (nytimes.com), etc.

As shown in FIG. 23, content engine 2302 is communicatively coupled to social network 102 by a communication interface 2304. Communication interface 2304 may include any type and/or combination of communication links, including wired and/or wireless links, such as IEEE 802.11 wireless LAN (WLAN) wireless links, Ethernet links, USB links, etc. Content engine 2302 may coupled to any configuration of social network 102. For example, FIG. 25 shows a block diagram of a brand marketing and social network system 2500, according to an example embodiment of the present invention. As shown in FIG. 25, brand marketing and social network system 2500 is similar to system 400 shown in FIG. 4, with the addition of content engine 2302. Content engine 2302 is communicatively coupled to network 404 by communication interface 2302. Thus, content engine 2302 may accessed by each of users devices 402, by social network engine 406, and by brand engine 104. A user device of user devices 402 may transmit a request for content through network 404 (and the respective communication links) to content engine 2302. In response, content engine 2302 selects content, and transmits the selected content to the requesting user device of user devices 402.

The content received from content engine 2302 may be displayed by the user device in connection with the display of brand profiles. For example, FIG. 26 shows a block diagram of display 1802 of the user device of first user, according to an embodiment of the present invention. In the example of FIG. 26, first user 108a interacts with browser 1804 in a manner to display a brand profile 2602 of second user 108b. For instance, in the example of FIG. 26, first user 108a has requested to view user profile page 600b of second user 108b. Furthermore, content is requested from content engine 2302 in conjunction with the display of brand profile 2602. For example, the user may have submitted a search query to search engine 2402 or may have requested news content from news engine 2406. Alternatively, a request for an advertisement may have been automatically transmitted to advertising engine 2404 upon attempting to view user profile page 600b, or other request for content, automatically or manually, may have been provided.

The content returned from content engine 2302 is displayed in a content section 2604 of profile page 600b. Content section 2604 may be displayed in profile page 600b in any location, including adjacent to brand profile 2602 (as shown in FIG. 26), above brand profile 2602, below brand profile 2602, etc. Any amount of content may be returned from content engine 2302 to be shown in content section 2604. For instance, in the example of FIG. 26, three items of content are shown in content section 2604, first content item 2606a, second content item 2606b, and third content item 2606c. Content items 2606 may each be an advertisement, a search result (e.g., a brief description of the search result and an associated link) in a list of search results, a news article result (e.g., a brief description of the news article and an associated link) in a list of news articles, or other type of content.

In an embodiment, the display of returned content is modified based on context. FIG. 27 shows a flowchart 2700 for providing content, according to an example embodiment of the present invention. In an embodiment, flowchart 2700 may be performed by brand engine 104. Further structural and operational embodiments will be apparent to persons skilled in the relevant art(s) based on the discussion regarding flowchart 2700. Flowchart 2700 is described as follows.

Flowchart 2700 begins with step 1402. In step 1402, a request is received from a first user to display user information of a second user, the first user having associated user information that includes a first brand profile, and the user information of the second user including a second brand profile. Step 1402 is described in detail above with respect to flowchart 1400 of FIG. 14. This description of step 1402 is not repeated here for purposes of brevity.

Step 1402 is illustrated with respect to FIG. 28. FIG. 28 shows a brand advertising and social network system 2800, according to an example embodiment of the present invention. System 2800 illustrates communications between a user device 2802, brand engine 104, and content engine 2302 through network 404, as may be performed in systems 2300 and 2500 described above with respect to FIGS. 23 and 25. As shown in FIG. 28, a user (e.g., first user 108a) interacts with user device 2802 to generate a brand profile publication and content request 2806. Brand profile publication and content request 2806 is a request from first user 108a to view a brand profile of another user—second user 108b—and includes a request for content (e.g., generated automatically or manually by user 108a).

According to step 1402, brand engine 104 receives brand profile publication and content request 2806. Brand engine 104 operates in accordance with the brand profile publication request portion of brand profile publication and content request 2806. For example, FIG. 29 shows a block diagram of a publication manager 2900, according to an embodiment of the present invention. Publication manager 2900 is similar to publication manager 1500 shown in FIG. 15, and described above, with the addition of a content modifier module 2902. As shown in FIG. 29, mapping module 1502 of publication manager 2900 receives brand profile publication and content request 2806, which includes the request from first user 108a to view the brand profile of second user 108b.

In step 1404, the user information of the first user is mapped to at least the user information of the second user. For example, as described above, mapping module 1502 of publication manager 2900 receives brand profile publication and content request 2806. Mapping module 1502 operates in accordance with the brand profile publication request portion of brand profile publication and content request 2806, and thus operates in a similar fashion as if brand profile publication request 1508 (FIG. 15) is received. As described above, mapping module 1502 generates a map of user information 110a of first user 110a and of user information 110 of one or more further users (e.g., of user 108b, users 110c-110x, etc.). Mapping module 1502 may map any portion of user data 510, including any one or more of spatial data 502, temporal data 504, social data 506 and topical data 508, for user 108a and the additional user(s) to generate map 1512. The mapping of step 1404 is described in detail above, and is therefore not repeated here for purposes of brevity.

In step 2302, a modified representation of content is generated based on the map. As shown in FIG. 28, brand profile publication and content request 2806 is received by content engine 2302. Content engine 2302 operates in accordance with the content request portion of brand profile publication and content request 2806. In response, content engine 2302 selects content. The selected content may be in the form of a list of search results, a list of advertisements, a list of news content, or any other content results. The selected content is transmitted in a content results signal 2808 to brand engine 104.

As shown in FIG. 29, content results signal 2808 is received by content modifier module 2902. In an embodiment, content modifier module 2902 generates a modified representation of the content received in content results signal 2808 based on the map generated in step 1404. As shown in FIG. 29, content modifier module 2902 receives map 1512. Content modifier module 2902 generates a modified content response 2810 based on map 1512 and content results signal 2808. Response 2810 includes a modified content representation. Response 2810 is transmitted from content modifier module 2902 to the requesting user in social network 102 (e.g., first user 108a at user device 2802 shown in FIG. 28).

Content modifier module 2902 may generate the modified content representation to include a representation of any type and amount of modification to the content received in content results signal 2808. Example types of modifications include filtering of content items received in content results signal 2808 (e.g., removing one or more content items), sorting of contents received in content results signal 2808 (e.g., reordering of content items), providing a recommendation for one or more content items, and modifying one or more content items. The modified content representation may include any one of, or any combination of these modification types. Examples of these types of modifications are described as follows with respect to FIGS. 30-33 in the context of a mapping of two users, for ease of illustration.

As described above, FIG. 17 shows an example of user information 110a and user information 110b stored in social network database 410. User information 110a includes brand profile 112a, and user information 110b includes brand profile 112b. As shown in FIG. 17, brand profile 112a includes brand objects 204a-204e, and brand profile 112b includes brand objects 204a, 204c, 204d, and 204f-204h. As shown in FIG. 26, if first user 108a displays brand profile 112b of second user 108b, brand objects 204a, 204c, 204d, and 204f-204h are displayed, as well as content section 2604 containing first-third content items 2606a-2606c. First-third content items 2606a-2606c may be three content items returned by content engine 2302 (without modification). Note that any number of content items may be returned by content engine 2302, and therefore may be contained in content section 2604, including tens, hundreds, and even more content items.

In an embodiment of the present invention, if first user 108a attempts to display brand profile 112b of second user 108b (e.g., by attempting to view the user profile page of second user 108b), request 2806 is generated at user device 2802 of first user 108a. Request 2806 is transmitted from user device 2802, and is received by content engine 2302 and brand engine 104. Content engine 2302 generates content results signal 2808, which is received by content modifier module 2902 shown in FIG. 29. Request 2806 is received by mapping module 1502, which maps user information 110*a* to user information 110*b* as described above with respect to step 1404, and generates map 1512. Map 1512 may be used to determine relationships between users 108*a* and 108*b*, which may be used by content modifier module 2902 to generate a modified representation of the content received in content results signal 2808. Map 1512 is received by content modifier module 2902.

In an embodiment, content modifier module 2902 may be configured to filter content items received in content results signal 2808 in step 2702 of flowchart 2700 based on map 1512. Content modifier module 2902 receives map 1512, which includes the mapping of user information 110*a* to user information 110*b*, and generates a filtered representation of the content items received in content results signal 2808 based on map 1512. In the filtered representation, one or more of content items 2606 are not present. For instance, content modifier module 2902 may be configured to filter out content items 2606 that relate to brand objects 204 that are not present in both of brand profiles 112*a* and 112*b* shown in FIG. 17 (filter out topical data 508 that does not overlap). Content modifier module 2902 may generate response 2810 to include content items 2606 that relate to common brand objects—brand objects 204*a*, 204*c*, and 204*d*. For example, content items 2606*a* and 2606*c* may relate to one or more of brand objects 204*a*, 204*c*, and 204*d*. For instance, content items 2606*a* and 2606*c* may be search results, advertisements, news articles, etc., that relate to brand objects 204*a*, 204*c*, and 204*d*. However, content item 2606*b* may not relate to any of brand objects 204*a*, 204*c*, and 204*d*. Thus, content item 2606*b* may be filtered out by content modifier module 2902.

For example, FIG. 30 shows display 1802 of user device 2802 of first user 108*a*, according to an embodiment of the present invention. In the example of FIG. 18, first user 108*a* interacts with a browser 1804 to display a brand profile of second user 108*b*. In the current example, content modifier module 2902 generated response 2810 to include content items 2606*a* and 2606*c*. User device 2802 of first user 108*a* receives response 2810, and as a result display 1802 displays a modified content section 3004 that includes content items 2606*a* and 2606*c* (content item 2606*b* is filtered out).

In another filtering example, content modifier module 2902 may be configured to filter out content items 2606 that relate to brand objects 204 that are present in brand profile 112*a* (filter out overlapping topical data 508). For instance, in the current example, content modifier module 2902 may generate response 2810 to include content item 2606*b*, which relates to brand objects 204*f*-204*h* (which are present in brand profile 112*b* of second user 108*b*, but are not present in brand profile 112*a* of first user 108*a*). As a result, the display of the user device of first user 108*a* may display a modified content section that includes content item 2606*b*. Content modifier module 2902 may be configured to perform further types of filtering of content items based on map 1512.

In one filtering example, as described above, relationship information 514 of social data 506 (shown in FIG. 5) may list "friends" for first user 108*a*. These friends may be categorized as "relatives," "spouse," "parents," "children," "cousins," "best friends," "boss," "co-workers," and/or any other suitable category. In an embodiment, content modifier module 2902 may be configured to filter content items received in content results signal 2808 based on the relationship between user 108*a* and user 108*b*. For example, if second user 108*a* is a child of first user 108*a*, content modifier module 2902 may be configured to filter out content items that second user 108*a* (child) may not want first user 108*a* (parent) to view, such as content items related to youth-oriented entertainment brands (e.g., rock bands, rap artists, etc.). In the opposite case, if second user 108*a* is a parent of first user 108*a*, content modifier module 2902 may be configured to filter out content items that second user 108*a* (parent) may not want first user 108*a* (child) to view, such as content items related to more mature themed brands (e.g., movies having violence or other mature themes, alcoholic beverages, cigarettes, etc.). Content modifier module 2902 may be configured to filter content items based on any indicated relationship between first and second user 108*a* and 108*b*. In a similar manner, content modifier module 2902 may be configured to sort, recommend, and/or modify content items based on relationships (and/or based on temporal data 504).

In another embodiment, content modifier module 2902 may be configured to sort content items in step 2702 of flowchart 2700 based on map 1512. Content modifier module 2902 receives map 1512, which includes the mapping of user information 110*a* to user information 110*b*, and generates a sorted representation of content items 2606 received in content results signal 2808 based on map 1512. In the sorted representation, content items 2606*a*-2606*c* may be sorted into a different order. For example, one of content items 2606*a*-2606*c* may be determined by analysis of map 1512 to be more relevant to first user 108*a*, and thus may be moved to be displayed first. For instance, the most relevant brand object may be content item 2606*c*. Content item 2606*c* may be determined to be most relevant because it is indicated in map 1512 as most closely relating to brand objects 204*a*-204*e* of first user 108*a* (has a greatest overlap of spatial, temporal, social, and/or topical data 502-508 between first and second users 108*a* and 108*b*), because the most advertising revenue is received from display of content item 2606*c*, and/or for any other reason. A sorted second content item, third content item, etc., may be selected in a similar manner for the sorted representation of received content items. In the current example, content modifier module 2902 may generate response 2810 to include the following sorted list of content items—content item 2606*c*, content item 2606*a*, and 2606*b*, ranked from greatest relevant to least relevance.

FIG. 31 shows display 1802 of the user device of first user 108*a* displaying sorted content items, according to an embodiment of the present invention. In the example of FIG. 31, first user 108*a* interacts with browser 1804 to display a brand profile of second user 108*b*. In the current example, content modifier module 2902 generated response 2810 to include sorted content items, in the order of content items 2606*c*, 2606*a*, and 2606*b*. The user device of first user 108*a* receives response 2810, and as a result, display 1802 displays a modified content section 3104 that includes sorted content items 2606*c*, 2606*a*, and 2606*b*. Sorting may be particularly useful when the number of content items 2606 is very large, including being too large to display all content items 2606 at once, and thus important content items 2606 can be sorted to the beginning of the list to be more easily visible.

In another embodiment, content modifier module 2902 may be configured to add/recommend content items in step 2702 of flowchart 2700 based on map 1512. Content modifier module 2902 receives map 1512, which includes the mapping of user information 110*a* to user information 110*b*, and generates a representation of content items 2606 received in content results signal 2808 based on map 1512 that includes a recommended content item. In a generated representation of content items, content items 2606*a*-2606*c* may be present, as well as a recommended content item. The recommended content item may be determined by analysis of map 1512 to be relevant to first user 108*a*, and thus added as recommended content item. In an embodiment, the recommended content item is not be a result of the content selection performed by content engine 2302 due to request 2806 from user 108a, but may be additional content selected by content engine 2302. For example, brand engine 104 may be configured to transmit a content request to content engine 2302 based on a relationship indicated in map 1512. The content returned by content engine 2302 in response to the request may be provided as a recommended content item. Any number of recommended content items may be determined. In the current example, content modifier module 2902 may generate response 2810 to include the content items 2606a-2606c and a recommended content item 3206.

FIG. 32 shows display 1802 of the user device of first user 108a displaying a recommended content item, according to an embodiment of the present invention. In the example of FIG. 32, first user 108a interacts with browser 1804 to display a brand profile of second user 108b. In the current example, content modifier module 2902 generated response 2810 to include content items 2606a-2606c and recommended content item 3206. User device 2802 of first user 108a receives response 2810, and as a result, display 1802 displays a modified content section 3204 that includes content items 2606a-2606c and recommended content item 3206 in a recommended content section 3202 (which may be indicated in display 1802 by the text "recommended content" or by other suitable text/image).

In another embodiment, content modifier module 2902 may be configured to modify one or more content items in step 2702 of flowchart 2700 based on map 1512. Content modifier module 2902 receives map 1512, which includes the mapping of user information 110a to user information 110b, and generates a representation of content items 2606 received in content results signal 2808 based on map 1512 that includes a modified content item. For example, in a generated representation of content items, content items 2606a-2606c may be present. Content item 2606b may be determined by analysis of map 1512 to be desired for modification for one or more reasons. For example, content item 2606b may be modified because it is determined to be of heightened or decreased relevance to first user 108a by analysis of map 1512 (e.g., due to a relationship with other brand objects 204), because content item 2606b is related to brand objects determined to be of interest to both of first and second users 108a and 108b by analysis of map 1512, and/or for any other reason. Any number of content items may be modified. In the current example, content modifier module 2902 may generate response 2810 to include the content items 2606a and 2606c and a modified version of content item 2606b.

FIG. 33 shows display 1802 of the user device of first user 108a displaying a modified content item, according to an embodiment of the present invention. In the example of FIG. 33, first user 108a interacts with browser 1804 to display a brand profile of second user 108b. In the current example, content modifier module 2902 generated response 2810 to include content items 2606a and 2606c, and a modified version of content item 2606b. The user device of first user 108a receives response 2810, and display 1802 displays a modified content section 3304 that includes content items 2606a and 2606c, and shows a modified version of content item 2606b as modified content item 3302b.

A content item may be modified in any manner. For example, modified content item 3302b can be modified (relative to other content items 2606) to have modified text and/or graphics. Modified content item 3302b may have different text and/or one or more different images relative to content items 2606, may be blinking, may have one or more different colors, etc. The modification may be intended to cause attention to be drawn to modified content item 3302b, such as by using brighter colors, motion, etc., if content item 2606b is determined to have heightened relevance. Alternatively, the modification may be intended to draw less attention to modified content item 3302b, such as by using muted colors, grayscale, etc., if content item 2606b is determined to have decreased relevance.

Thus, content modifier module 2902 may modify display of content items in a variety of ways. Such modifications are based upon map 1512, which may include a mapping between user information of users 102a and 102b (as in the immediately preceding examples), or a mapping between user information of user 102a and user information of a plurality of further users (including user 102b). Map 1512 may include a mapping of spatial data 502, temporal data 504, social data 506, and/or topical data 508 of users, as described above.

In an embodiment, step 2702 of flowchart 2700 may be performed by content modifier module 2902 according to a flowchart 3400 shown in FIG. 34. FIG. 34 shows a flowchart 3400 for generating modified content, according to an example embodiment of the present invention. Flowchart 3400 is a continuation of flowchart 1600 described above with respect to mapping module 1502. Flowchart 3400 is described as follows.

In step 2202, one or more relationships between brand profiles of the first user and the plurality of users are determined from the graph of step 1604. In step 2204, one or more probability scores corresponding to the determined one or more relationships are determined. Steps 2202 and 2204 are described in detail further above, and thus are not described again for purposes of brevity.

In step 3402, the modified representation of the content is determined based on the one or more probability scores. The modified representation of content items 2606 received in content results signal 2808 may be determined based on the one or more probability scores determined in step 2204, to provide a filtered and/or sorted list of content items, to provide a content item recommendation, and/or to provide a modified content item.

For instance, in the case where 78% of users that include all of brand objects 204a-204e in their brand profiles also include brand object 204f in their brand profiles, content modifier module 2902 may generate a recommendation (e.g., FIG. 32) of a content item related to brand object 204f to user 108a. For example, if brand object 204f is associated with Lindsay Lohan, content modifier module 2902 may recommend a news article content item in the returned content that mentions "Lindsay Lohan." If brand object 204f is associated with Apple Computer, content modifier module 2902 may provide an iPhone advertisement content item as a recommendation. Furthermore, or alternatively, content modifier module 2902 may generate a modified brand profile that sorts a content item related to brand object 204f to be located near the top or at the top of a content item list (e.g., FIG. 31). Furthermore, content modifier module 2902 may generate a modified version of a content item related to brand object 204f to attract attention to the content item (e.g., FIG. 33).

In the case where only 12% of users that include all of brand objects 204a-204e in their brand profiles also include brand object 204g in their brand profiles, content modifier module 2902 may generate a modified content section that filters out (does not display) a content item related to brand object 204g. Furthermore, or alternatively, content modifier module 2902 may generate a modified content section that sorts a content item related to brand object 204g to be located near the bottom, or at the bottom, of the list of displayed content items. Furthermore, content modifier module 2902 may generate a modified version of a content item related to brand object 204g that is configured to attract less attention to the content item (e.g., FIG. 32) (e.g., the modified content item may have a duller color, may be turned to a grayscale or black and white image, etc.).

Content modifier module 2902 may be implemented in hardware, software, firmware, or any combination thereof. For example, content modifier module 2902 may each be implemented in code configured to execute in one or more processors.

Referring back to flowchart 2700 in FIG. 27, in step 2704, the modified representation of the content is transmitted for display. As described above, a modified content response 2810, which includes the generated modified version of the content received in content results signal 2808, is generated by content modifier module 2902. As shown in FIG. 28, modified content response 2810 is transmitted from brand engine 104, through network 404, to user device 2802 of first user 108a. FIGS. 30-33 show examples of display 1802 of a user device of first user 108a displaying the modified content received in modified content response 2810 (e.g., modified content sections 3004, 3104, 3204, or 3304 of FIGS. 30-33).

V. Example Computer Implementation

The embodiments described herein, including systems, methods/processes, and/or apparatuses, may be implemented using well known servers/computers, such as computer 3500 shown in FIG. 35. For example, brand engine 104 of FIGS. 1, 4, 23, 25, and 28, brand engine 300 of FIG. 3, social network engine 406 of FIGS. 4 and 25, flowchart 1400 of FIG. 14, publication manager 1500 of FIG. 15, flowchart 1600 of FIG. 16, flowchart 2200 of FIG. 22, content engine 2302 of FIGS. 23-25 and 28, flowchart 2700 of FIG. 27, publication manager 2900 of FIG. 29, and flowchart 3400 of FIG. 34 can each be implemented using one or more computers 3500.

Computer 3500 can be any commercially available and well known computer capable of performing the functions described herein, such as computers available from International Business Machines, Apple, Sun, HP, Dell, Cray, etc. Computer 3500 may be any type of computer, including a desktop computer, a server, etc.

Computer 3500 includes one or more processors (also called central processing units, or CPUs), such as a processor 3504. Processor 3504 is connected to a communication infrastructure 3502, such as a communication bus. In some embodiments, processor 3504 can simultaneously operate multiple computing threads.

Computer 3500 also includes a primary or main memory 3506, such as random access memory (RAM). Main memory 3506 has stored therein control logic 3528A (computer software), and data.

Computer 3500 also includes one or more secondary storage devices 3510. Secondary storage devices 3510 include, for example, a hard disk drive 3512 and/or a removable storage device or drive 3514, as well as other types of storage devices, such as memory cards and memory sticks. For instance, computer 3500 may include an industry standard interface, such a universal serial bus (USB) interface for interfacing with devices such as a memory stick. Removable storage drive 3514 represents a floppy disk drive, a magnetic tape drive, a compact disk drive, an optical storage device, tape backup, etc.

Removable storage drive 3514 interacts with a removable storage unit 3516. Removable storage unit 3516 includes a computer useable or readable storage medium 3524 having stored therein computer software 3528B (control logic) and/or data. Removable storage unit 3516 represents a floppy disk, magnetic tape, compact disk, DVD, optical storage disk, or any other computer data storage device. Removable storage drive 3514 reads from and/or writes to removable storage unit 3516 in a well known manner.

Computer 3500 also includes input/output/display devices 3522, such as monitors, keyboards, pointing devices, etc.

Computer 3500 further includes a communication or network interface 3518. Communication interface 3518 enables the computer 3500 to communicate with remote devices. For example, communication interface 3518 allows computer 3500 to communicate over communication networks or mediums 3542 (representing a form of a computer useable or readable medium), such as LANs, WANs, the Internet, etc. Network interface 3518 may interface with remote sites or networks via wired or wireless connections.

Control logic 3528C may be transmitted to and from computer 3500 via the communication medium 3542.

Any apparatus or manufacture comprising a computer useable or readable medium having control logic (software) stored therein is referred to herein as a computer program product or program storage device. This includes, but is not limited to, computer 3500, main memory 3506, secondary storage devices 3510, and removable storage unit 3516. Such computer program products, having control logic stored therein that, when executed by one or more data processing devices, cause such data processing devices to operate as described herein, represent embodiments of the invention.

The invention can work with software, hardware, and/or operating system implementations other than those described herein. Any software, hardware, and operating system implementations suitable for performing the functions described herein can be used.

Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for displaying brand information, comprising:
receiving, by a computing device, a request from a user device operated by a first user to display user information of a second user in a social network that enables the first user and the second user to interact with brands of interest, the first user having associated user information displayed on a first user profile page that includes a first brand profile, the first brand profile including a first plurality of brand objects selected by the first user based on an interest of the first user in brands that the first plurality of brand objects represent, and the user information of the second user displayed on a second user profile page including a second brand profile that includes a second plurality of brand objects selected by the second user based on an interest of the second user in brands that the second plurality of brand objects represent, each brand object including at least an image that is representative of a corresponding brand, each user profile page comprising associated user information, a friend section, postings, and a brands section;
mapping, by the computing device, the user information of the first user to at least the user information of the second user in a map;

determining, by the computing device and from the map, relationships between the first user and the second user;

generating, by the computing device, a modified representation of the second brand profile based on the determined relationships, said generating a modified representation of the second brand profile comprising:

generating one or more probability scores corresponding to the determined relationships; and determining the modified representation of the second brand profile based on the one or more probability scores; and transmitting, by the computing device, the modified representation to the user device to enable display of the modified representation by the user device.

2. The method of claim 1, wherein said mapping the user information of the first user to at least the user information of the second user comprises:

mapping the user information of the first user to user information of a plurality of users.

3. The method of claim 2, wherein said mapping the user information of the first user to user information of a plurality of users comprises:

retrieving user data from the user information of each of the first user and the plurality of users, the user data including one or more of spatial, temporal, social, or topical data associated with each user; and graphing the retrieved user data.

4. The method of claim 1, wherein said generating a modified representation of the second brand profile based on said mapping comprises:

determining a brand object based at least on said mapping; and wherein said transmitting comprises transmitting the determined brand object to the user device to enable the determined brand object to be displayed as a brand recommendation.

5. The method of claim 1, wherein said generating a modified representation of the second brand profile based on said mapping comprises:

modifying a brand object of the second plurality of brand objects based on said mapping; and wherein said transmitting comprises transmitting the modified brand object to the user device to enable the modified brand object to be displayed.

6. The method of claim 1, wherein said generating a modified representation of the second brand profile based on said mapping comprises:

filtering the second brand profile based on the mapping so that fewer than all of the brand objects in the second plurality of brand objects is included in the modified representation of the second brand profile; and wherein said transmitting comprises transmitting the filtered second brand profile to the user device to enable the filtered second brand profile to be displayed.

7. The method of claim 1, wherein said generating a modified representation of the second brand profile based on said mapping comprises:

sorting the second plurality of brand objects based on said mapping; and wherein said transmitting comprises transmitting the sorted second plurality of brand objects to the user device to enable the sorted second plurality of brand objects to be displayed.

8. The method of claim 1, further comprising:

enabling revenue to be generated based on display of the modified representation of second brand profile.

9. A brand engine, comprising:

a mapping module executed by a processor and configured to receive a request from a user device operated by a first user to display user information of a second user in a social network that enables the first user and the second user to interact with brands of interest, the first user having associated user information displayed on a first user profile page that includes a first brand profile, the first brand profile including a first plurality of brand objects selected by the first user based on an interest of the first user in brands that the first plurality of brand objects represent, and the user information of the second user displayed on a second user profile page including a second brand profile that includes a second plurality of brand objects selected by the second user based on an interest of the second user in brands that the second plurality of brand objects represent, wherein the mapping module is configured to map the user information of the first user to at least the user information of the second user to generate a map, each user profile page comprising associated user information, a friend section, postings, and a brands section; and a brand profile modifier module executed by the processor and configured to:

determine, from the map, relationships between the first user and the second user; and generate a modified representation of the second brand profile based at least on the determined relationships, said brand profile modifier module configured to generate a modified representation of the second brand profile by being configured to:

generate one or more probability scores corresponding to the determined relationships; and determine the modified representation of the second brand profile based on the one or more probability scores;

wherein the brand engine is configured to transmit the modified representation of the second brand profile to the user device to enable the modified representation to be displayed by the user device, the modified representation including one or more brand objects comprising data structures containing information representative of an aspect of a corresponding brand, each brand object including at least an image.

10. The brand engine of claim 9, wherein the mapping module is configured to map the user information of the first user to user information of a plurality of users.

11. The brand engine of claim 10, wherein the mapping module is configured to access storage to retrieve user data from the user information of each of the first user and the plurality of users, the user data including one or more of spatial, temporal, social, or topical data associated with each user; and wherein the mapping module is configured to generate graph data for a graph of the retrieved user data.

12. The brand engine of claim 9, wherein the brand profile modifier module is configured to determine a brand object based at least on the generated map; and wherein the brand engine is configured to transmit the determined brand object to the user device to enable the determined brand object to be displayed as a brand recommendation.

13. The brand engine of claim 9, wherein the brand profile modifier module is configured to modify a brand object of the second plurality of brand objects based on the generated map; and wherein the brand engine is configured to transmit the modified brand object to the user device to enable the modified brand object to be displayed.

14. The brand engine of claim 9, wherein the brand profile modifier module is configured to filter the second brand profile based on the generated map so that fewer than all of the brand objects in the second plurality of brand objects is included in the modified representation of the second brand profile; and wherein the brand engine is configured to transmit the filtered second brand profile to the user device to enable the filtered second brand profile to be displayed.

15. The brand engine of claim 9, wherein the brand profile modifier module is configured to sort the second plurality of brand objects based on the generated map; and wherein the brand engine is configured to transmit the sorted second plurality of brand objects to the user device to enable the sorted second plurality of brand objects to be displayed.

16. The brand engine of claim 9, further comprising:

a commerce manager configured to enable revenue to be generated based on display of the modified representation of second brand profile.

17. A system, comprising:

a brand object manager configured to generate a brand collection that contains information of one or more brands represented as brand objects;

an association manager configured to enable associations to be formed between one or more users and one or more brand objects from the brand collection; and a publication manager, at least partially implemented in hardware, configured to manage publication of a brand profile that includes the one or more brand objects, the publication manager comprising:

a mapping module configured to map user information of a first user to at least user information of a second user and generate a map that indicates one or more overlaps in the user information of the first user and the user information of the second user and configured to determine, from the map, relationships between the first user and the second user; and a brand profile modifier module configured to generate a modified representation of the brand profile based at least on the determined relationships, wherein the brand profile modifier module being configured to generate a modified representation comprises the brand profile modifier module configured to generate one or more probability scores corresponding to the determined relationships, and determine the modified representation of the brand profile based on the one or more probability scores, wherein the user information of the first user is displayed on a first user profile page and the user information of the second user is displayed on a second user profile page, each user profile page comprising associated user information, a friend section, postings, and a brands section.

18. The system of claim 17, further comprising a commerce manager configured to track interaction of one or more users with one or more brand objects.

\* \* \* \* \*